United States Patent
Remahl et al.

(10) Patent No.: US 7,630,974 B2
(45) Date of Patent: Dec. 8, 2009

(54) MULTI-LANGUAGE SUPPORT FOR ENTERPRISE IDENTITY AND ACCESS MANAGEMENT

(75) Inventors: Thomas Remahl, Los Altos, CA (US); Andy Tsang, San Jose, CA (US); Bob Summers, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 192 days.

(21) Appl. No.: 10/952,592

(22) Filed: Sep. 28, 2004

(65) Prior Publication Data

US 2006/0074894 A1    Apr. 6, 2006

(51) Int. Cl.
*G06F 7/00* (2006.01)
*G06F 17/28* (2006.01)

(52) U.S. Cl. .............................................. 707/4; 704/7
(58) Field of Classification Search ...................... 707/4, 707/1, 100; 704/8, 9, 7; 709/246; 358/1.9; 719/315
See application file for complete search history.

(56) References Cited

U.S. PATENT DOCUMENTS

| | | | |
|---|---|---|---|
| 4,484,306 A | 11/1984 | Kulczyckyj et al. | |
| 4,956,769 A | 9/1990 | Smith | |
| 4,961,224 A | 10/1990 | Yung | |
| 5,010,478 A | 4/1991 | Deran | |
| 5,077,666 A | 12/1991 | Brimm et al. | |
| 5,113,499 A | 5/1992 | Ankney et al. | |
| 5,226,143 A | 7/1993 | Baird et al. | |
| 5,301,320 A | 4/1994 | McAtee et al. | |
| 5,428,795 A | 6/1995 | Johnson et al. | |
| 5,442,782 A * | 8/1995 | Malatesta et al. | .............. 707/4 |

(Continued)

FOREIGN PATENT DOCUMENTS

| WO | WO 00/70507 A1 | 11/2000 |
|---|---|---|
| WO | WO 02/07396 A1 | 1/2002 |

OTHER PUBLICATIONS

Barrett, Debbie, "Diary Of A Break-And-Enter, Cyber Style," Technology in Government, p. 22, Jan. 2000.

(Continued)

*Primary Examiner*—Jean B. Fleurantin
*Assistant Examiner*—Joshua Bullock
(74) *Attorney, Agent, or Firm*—Townsend and Townsend and Crew LLP

(57) ABSTRACT

Systems and methods are provided for multi-language support through the management of multi-valued attributes. A data store maintains multi-valued attributes having language components and value components. The value components specify language specific values for the attributes and can be associated with corresponding language components. A server in communication with the data store can provide outputs to requesting users in accordance with a preferred language. For example, a request to access an identity profile maintained by an Identity System can be fulfilled by constructing a page or other output including the requested profile data. An Identity Server can construct the output to include attribute values corresponding to the preferred language associated with the request. Attribute configuration data can similarly be maintained with language components and value components. The configuration of an attribute such as its display name can be included in an output in accordance with a preferred language.

51 Claims, 8 Drawing Sheets

U.S. PATENT DOCUMENTS

| | | | |
|---|---|---|---|
| 5,455,953 A | 10/1995 | Russell | |
| 5,467,471 A | 11/1995 | Bader | |
| 5,499,371 A | 3/1996 | Henninger et al. | |
| 5,530,861 A | 6/1996 | Diamant et al. | |
| 5,557,742 A | 9/1996 | Smaha et al. | |
| 5,581,691 A | 12/1996 | Hsu et al. | |
| 5,596,746 A | 1/1997 | Shen et al. | |
| 5,659,616 A | 8/1997 | Sudia | |
| 5,664,154 A | 9/1997 | Purcell et al. | |
| 5,678,041 A | 10/1997 | Baker et al. | |
| 5,689,679 A | 11/1997 | Jouppi | |
| 5,692,125 A | 11/1997 | Schloss et al. | |
| 5,694,598 A | 12/1997 | Durand et al. | |
| 5,708,780 A | 1/1998 | Levergood et al. | |
| 5,713,023 A | 1/1998 | Hayata et al. | |
| 5,721,900 A | 2/1998 | Banning et al. | |
| 5,724,595 A | 3/1998 | Gentner | |
| 5,732,408 A | 3/1998 | Takahashi | |
| 5,734,837 A | 3/1998 | Flores et al. | |
| 5,745,574 A | 4/1998 | Muftic | |
| 5,754,939 A | 5/1998 | Herz et al. | |
| 5,757,920 A | 5/1998 | Misra et al. | |
| 5,764,890 A | 6/1998 | Glasser et al. | |
| 5,764,973 A * | 6/1998 | Lunceford et al. | 707/1 |
| 5,765,153 A | 6/1998 | Benantar et al. | |
| 5,793,966 A | 8/1998 | Amstein et al. | |
| 5,796,841 A | 8/1998 | Cordery et al. | |
| 5,802,518 A | 9/1998 | Karaev et al. | |
| 5,812,776 A | 9/1998 | Gifford | |
| 5,815,703 A | 9/1998 | Copeland et al. | |
| 5,819,271 A | 10/1998 | Mahoney et al. | |
| 5,822,454 A | 10/1998 | Rangarajan | |
| 5,826,029 A | 10/1998 | Gore, Jr. et al. | |
| 5,831,975 A | 11/1998 | Chen et al. | |
| 5,835,912 A * | 11/1998 | Pet | 707/104.1 |
| 5,842,212 A | 11/1998 | Ballurio et al. | |
| 5,848,273 A | 12/1998 | Fontana et al. | |
| 5,867,665 A | 2/1999 | Butman et al. | |
| 5,867,824 A | 2/1999 | Saito et al. | |
| 5,872,969 A | 2/1999 | Copeland et al. | |
| 5,875,461 A | 2/1999 | Lindholm | |
| 5,878,411 A | 3/1999 | Burroughs et al. | |
| 5,884,284 A | 3/1999 | Peters et al. | |
| 5,889,952 A | 3/1999 | Hunnicutt et al. | |
| 5,892,903 A | 4/1999 | Klaus | |
| 5,893,149 A | 4/1999 | Hagersten et al. | |
| 5,901,287 A | 5/1999 | Bull et al. | |
| 5,903,878 A | 5/1999 | Talati et al. | |
| 5,903,882 A | 5/1999 | Asay et al. | |
| 5,907,621 A | 5/1999 | Bachman et al. | |
| 5,907,837 A | 5/1999 | Ferrel et al. | |
| 5,908,469 A | 6/1999 | Botz et al. | |
| 5,924,096 A | 7/1999 | Draper et al. | |
| 5,940,394 A | 8/1999 | Killian | |
| 5,940,834 A | 8/1999 | Pinard et al. | |
| 5,944,780 A | 8/1999 | Chase et al. | |
| 5,944,824 A | 8/1999 | He | |
| 5,960,422 A | 9/1999 | Prasad | |
| 5,961,593 A | 10/1999 | Gabber et al. | |
| 5,966,702 A | 10/1999 | Fresko et al. | |
| 5,974,443 A * | 10/1999 | Jeske | 709/202 |
| 5,978,779 A | 11/1999 | Stein et al. | |
| 5,987,457 A | 11/1999 | Ballard | |
| 5,987,471 A | 11/1999 | Bodine et al. | |
| 5,991,768 A | 11/1999 | Sun et al. | |
| 5,991,771 A | 11/1999 | Falls et al. | |
| 5,991,807 A | 11/1999 | Schmidt et al. | |
| 5,991,810 A | 11/1999 | Shapiro et al. | |
| 5,991,881 A | 11/1999 | Conklin et al. | |
| 5,999,911 A | 12/1999 | Berg et al. | |
| 6,005,571 A | 12/1999 | Pachauri | |
| 6,012,059 A | 1/2000 | Neimat et al. | |
| 6,012,098 A * | 1/2000 | Bayeh et al. | 709/246 |
| 6,026,474 A | 2/2000 | Carter et al. | |
| 6,028,605 A | 2/2000 | Conrad et al. | |
| 6,029,195 A | 2/2000 | Herz | |
| 6,032,227 A | 2/2000 | Shaheen et al. | |
| 6,041,306 A | 3/2000 | Du et al. | |
| 6,041,357 A | 3/2000 | Kunzelman et al. | |
| 6,044,462 A | 3/2000 | Zubeldia et al. | |
| 6,044,465 A | 3/2000 | Dutcher et al. | |
| 6,049,776 A | 4/2000 | Donnelly et al. | |
| 6,058,381 A | 5/2000 | Nelson | |
| 6,058,480 A | 5/2000 | Brown | |
| 6,061,726 A | 5/2000 | Cook et al. | |
| 6,061,740 A | 5/2000 | Ferguson et al. | |
| 6,061,799 A | 5/2000 | Eldridge et al. | |
| 6,064,656 A | 5/2000 | Angal et al. | |
| 6,067,548 A | 5/2000 | Cheng | |
| 6,073,109 A | 6/2000 | Flores et al. | |
| 6,073,174 A | 6/2000 | Montgomerie et al. | |
| 6,073,242 A | 6/2000 | Hardy et al. | |
| 6,078,747 A | 6/2000 | Jewitt | |
| 6,081,518 A | 6/2000 | Bowman-Amuah | |
| 6,085,188 A | 7/2000 | Bachmann et al. | |
| 6,088,679 A | 7/2000 | Barkley | |
| 6,088,796 A | 7/2000 | Cianfrocca et al. | |
| 6,098,056 A | 8/2000 | Rusnak et al. | |
| 6,104,705 A | 8/2000 | Ismail et al. | |
| 6,105,006 A | 8/2000 | Davis et al. | |
| 6,105,063 A | 8/2000 | Hayes, Jr. | |
| 6,105,066 A | 8/2000 | Hayes, Jr. | |
| 6,112,181 A | 8/2000 | Shear et al. | |
| 6,119,167 A | 9/2000 | Boyle et al. | |
| 6,131,120 A | 10/2000 | Reid | |
| 6,133,916 A | 10/2000 | Bukszar et al. | |
| 6,134,634 A | 10/2000 | Marshall, Jr. et al. | |
| 6,134,658 A | 10/2000 | Multerer et al. | |
| 6,138,104 A | 10/2000 | Marchak et al. | |
| 6,141,778 A | 10/2000 | Kane et al. | |
| 6,145,003 A | 11/2000 | Sanu et al. | |
| 6,151,531 A | 11/2000 | Frankel et al. | |
| 6,154,741 A | 11/2000 | Feldman | |
| 6,154,776 A | 11/2000 | Martin | |
| 6,157,925 A | 12/2000 | Jenkins et al. | |
| 6,157,942 A | 12/2000 | Chu et al. | |
| 6,158,010 A | 12/2000 | Moriconi et al. | |
| 6,163,781 A | 12/2000 | Wess, Jr. | |
| 6,163,844 A | 12/2000 | Duncan et al. | |
| 6,170,013 B1 | 1/2001 | Murata | |
| 6,173,311 B1 | 1/2001 | Hassett et al. | |
| 6,178,418 B1 | 1/2001 | Singer | |
| 6,182,086 B1 | 1/2001 | Lomet et al. | |
| 6,182,142 B1 | 1/2001 | Win et al. | |
| 6,185,608 B1 | 2/2001 | Hon et al. | |
| 6,185,650 B1 | 2/2001 | Boonie et al. | |
| 6,192,476 B1 | 2/2001 | Gong | |
| 6,195,689 B1 | 2/2001 | Bahlmann | |
| 6,195,696 B1 | 2/2001 | Baber et al. | |
| 6,195,710 B1 | 2/2001 | Borgendale et al. | |
| 6,208,986 B1 | 3/2001 | Schneck et al. | |
| 6,212,558 B1 | 4/2001 | Antur et al. | |
| 6,212,640 B1 | 4/2001 | Abdelnur et al. | |
| 6,216,199 B1 | 4/2001 | DeKoning et al. | |
| 6,216,231 B1 | 4/2001 | Stubblebine | |
| 6,219,667 B1 | 4/2001 | Lu et al. | |
| 6,223,291 B1 | 4/2001 | Puhl et al. | |
| 6,226,752 B1 | 5/2001 | Gupta et al. | |
| 6,230,185 B1 | 5/2001 | Salas et al. | |
| 6,233,576 B1 | 5/2001 | Lewis | |
| 6,233,618 B1 | 5/2001 | Shannon | |
| 6,240,360 B1 | 5/2001 | Phelan | |
| 6,240,414 B1 | 5/2001 | Beizer et al. | |
| 6,243,816 B1 | 6/2001 | Fang et al. | |

| | | | | | | |
|---|---|---|---|---|---|---|
| 6,253,202 B1 | 6/2001 | Gilmour | | 6,487,600 B1 | 11/2002 | Lynch |
| 6,253,239 B1 | 6/2001 | Shklar et al. | | 6,487,663 B1 | 11/2002 | Jaisimha et al. |
| 6,253,248 B1 | 6/2001 | Nakai et al. | | 6,490,655 B1 | 12/2002 | Kershaw |
| 6,253,257 B1 | 6/2001 | Dundon | | 6,493,702 B1 | 12/2002 | Adar et al. |
| 6,256,737 B1 | 7/2001 | Bianco et al. | | 6,493,731 B1 | 12/2002 | Jones et al. |
| 6,256,739 B1 | 7/2001 | Skopp et al. | | 6,499,023 B1 | 12/2002 | Dong et al. |
| 6,260,077 B1 | 7/2001 | Rangarajan et al. | | 6,499,107 B1 | 12/2002 | Gleichauf et al. |
| 6,263,332 B1 | 7/2001 | Nasr et al. | | 6,507,847 B1 | 1/2003 | Fleischman |
| 6,263,363 B1 | 7/2001 | Rosenblatt et al. | | 6,507,857 B1 | 1/2003 | Yalcinalp |
| 6,266,420 B1 | 7/2001 | Langford et al. | | 6,513,056 B1 | 1/2003 | Copeland et al. |
| 6,275,916 B1 | 8/2001 | Weldon, Jr. et al. | | 6,519,571 B1 | 2/2003 | Guheen et al. |
| 6,275,944 B1 | 8/2001 | Kao et al. | | 6,519,643 B1 | 2/2003 | Foulkes et al. |
| 6,278,993 B1 | 8/2001 | Kumar et al. | | 6,519,648 B1 | 2/2003 | Eyal |
| 6,279,001 B1 | 8/2001 | DeBettencourt et al. | | 6,519,767 B1 | 2/2003 | Carter et al. |
| 6,279,043 B1 | 8/2001 | Hayward et al. | | 6,523,022 B1 | 2/2003 | Hobbs |
| 6,282,546 B1 | 8/2001 | Gleichauf et al. | | 6,523,027 B1 | 2/2003 | Underwood |
| 6,286,098 B1 | 9/2001 | Wenig et al. | | 6,526,438 B1 | 2/2003 | Bienvenu et al. |
| 6,289,462 B1 | 9/2001 | McNabb et al. | | 6,526,447 B1 | 2/2003 | Giammaria |
| 6,292,833 B1 | 9/2001 | Liao et al. | | 6,529,941 B2 | 3/2003 | Haley et al. |
| 6,295,061 B1 | 9/2001 | Park et al. | | 6,536,037 B1 | 3/2003 | Guheen et al. |
| 6,301,668 B1 | 10/2001 | Gleichauf et al. | | 6,539,021 B1 | 3/2003 | Kennelly et al. |
| 6,304,949 B1 | 10/2001 | Houlsdworth | | 6,539,379 B1 | 3/2003 | Vora et al. |
| 6,311,269 B2 | 10/2001 | Luckenbaugh et al. | | 6,539,382 B1 | 3/2003 | Byrne et al. |
| 6,314,470 B1 | 11/2001 | Ward et al. | | 6,539,396 B1 | 3/2003 | Bowman-Amuah |
| 6,314,492 B1 | 11/2001 | Allen et al. | | 6,540,142 B1 | 4/2003 | Alleshouse |
| 6,317,783 B1 | 11/2001 | Freishtat et al. | | 6,542,515 B1 | 4/2003 | Kumar et al. |
| 6,321,338 B1 | 11/2001 | Porras et al. | | 6,542,993 B1 | 4/2003 | Erfani |
| 6,323,881 B1 | 11/2001 | Broulik | | 6,549,941 B1 | 4/2003 | Jaquith et al. |
| 6,324,656 B1 | 11/2001 | Gleichauf et al. | | 6,557,039 B1 | 4/2003 | Leong et al. |
| 6,330,569 B1 | 12/2001 | Baisley et al. | | 6,564,370 B1 | 5/2003 | Hunt |
| 6,335,927 B1 | 1/2002 | Elliott et al. | | 6,571,216 B1 | 5/2003 | Garg et al. |
| 6,336,124 B1 | 1/2002 | Alam et al. | | 6,571,279 B1 | 5/2003 | Herz et al. |
| 6,336,214 B1 | 1/2002 | Sundaresan | | 6,574,675 B1 | 6/2003 | Swenson |
| 6,338,097 B1 | 1/2002 | Krenzke et al. | | 6,578,147 B1 | 6/2003 | Shanklin et al. |
| 6,339,423 B1 | 1/2002 | Sampson et al. | | 6,584,548 B1 | 6/2003 | Bourne et al. |
| 6,339,826 B2 | 1/2002 | Hayes, Jr. et al. | | 6,584,569 B2 | 6/2003 | Reshef et al. |
| 6,343,287 B1 | 1/2002 | Kumar et al. | | 6,587,856 B1 | 7/2003 | Srinivasan et al. |
| 6,345,266 B1 | 2/2002 | Ganguly et al. | | 6,591,260 B1 | 7/2003 | Schwarzhoff et al. |
| 6,347,312 B1 | 2/2002 | Byrne et al. | | 6,591,347 B2 | 7/2003 | Tischler et al. |
| 6,347,374 B1 | 2/2002 | Drake et al. | | 6,598,058 B2 | 7/2003 | Bird et al. |
| 6,349,306 B1 | 2/2002 | Malik et al. | | 6,606,644 B1 | 8/2003 | Ford et al. |
| 6,353,929 B1 | 3/2002 | Houston | | 6,609,198 B1 | 8/2003 | Wood et al. |
| 6,356,892 B1 | 3/2002 | Corn et al. | | 6,609,205 B1 | 8/2003 | Bernhard et al. |
| 6,356,996 B1 | 3/2002 | Adams | | 6,611,840 B1 | 8/2003 | Baer et al. |
| 6,357,010 B1 | 3/2002 | Viets et al. | | 6,615,218 B2 | 9/2003 | Mandal et al. |
| 6,366,913 B1 | 4/2002 | Fitler, Jr. et al. | | 6,618,806 B1 | 9/2003 | Brown et al. |
| 6,366,987 B1 | 4/2002 | Tzeinic et al. | | 6,629,132 B1 | 9/2003 | Ganguly et al. |
| 6,367,013 B1 | 4/2002 | Bisbee et al. | | 6,632,251 B1 | 10/2003 | Rutten et al. |
| 6,374,359 B1 | 4/2002 | Shrader et al. | | 6,636,891 B1 | 10/2003 | LeClair et al. |
| 6,381,579 B1 | 4/2002 | Gervais et al. | | 6,640,307 B2 | 10/2003 | Viets et al. |
| 6,385,653 B1 | 5/2002 | Sitaraman et al. | | 6,643,661 B2 | 11/2003 | Polizzi et al. |
| 6,389,589 B1 | 5/2002 | Mishra et al. | | 6,647,383 B1 | 11/2003 | August et al. |
| 6,393,569 B1 | 5/2002 | Orenshteyn | | 6,647,393 B1 | 11/2003 | Dietterich et al. |
| 6,397,232 B1 | 5/2002 | Cheng-Hung et al. | | 6,655,593 B2 | 12/2003 | Alleshouse |
| 6,401,101 B1 | 6/2002 | Britton et al. | | 6,668,322 B1 | 12/2003 | Wood et al. |
| 6,401,138 B1 | 6/2002 | Judge et al. | | 6,671,695 B2 | 12/2003 | McFadden |
| 6,408,336 B1 | 6/2002 | Schneider et al. | | 6,671,745 B1 | 12/2003 | Mathur et al. |
| 6,415,321 B1 | 7/2002 | Gleichauf et al. | | 6,675,261 B1 | 1/2004 | Shandony |
| 6,415,368 B1 | 7/2002 | Glance et al. | | 6,678,733 B1 | 1/2004 | Brown et al. |
| 6,421,682 B1 | 7/2002 | Craig et al. | | 6,678,828 B1 | 1/2004 | Pham et al. |
| 6,421,768 B1 | 7/2002 | Purpura | | 6,680,942 B2 | 1/2004 | Mead et al. |
| 6,430,688 B1 | 8/2002 | Kohl et al. | | 6,691,232 B1 | 2/2004 | Wood et al. |
| 6,434,531 B1 | 8/2002 | Lancelot et al. | | 6,697,849 B1 | 2/2004 | Carlson |
| 6,438,690 B1 | 8/2002 | Patel et al. | | 6,701,368 B1 | 3/2004 | Chennapragada et al. |
| 6,442,567 B1 | 8/2002 | Retallick et al. | | 6,704,807 B1 | 3/2004 | Mathur et al. |
| 6,453,342 B1 | 9/2002 | Himmel et al. | | 6,704,873 B1 | 3/2004 | Underwood |
| 6,457,047 B1 | 9/2002 | Chandara et al. | | 6,708,170 B1 | 3/2004 | Byrne et al. |
| 6,457,066 B1 | 9/2002 | Mein et al. | | 6,711,632 B1 | 3/2004 | Chow et al. |
| 6,460,141 B1 | 10/2002 | Olden | | 6,718,328 B1 | 4/2004 | Norris |
| 6,463,418 B1 | 10/2002 | Todd | | 6,721,804 B1 | 4/2004 | Rubin et al. |
| 6,463,509 B1 | 10/2002 | Teoman et al. | | 6,728,685 B1 | 4/2004 | Ahluwalia |
| 6,466,932 B1 | 10/2002 | Dennis et al. | | 6,732,178 B1 | 5/2004 | Van Horne et al. |
| 6,470,386 B1 | 10/2002 | Combar et al. | | 6,741,853 B1 | 5/2004 | Jiang et al. |

| Patent No. | Date | Inventor |
|---|---|---|
| 6,741,992 B1 | 5/2004 | McFadden |
| 6,742,126 B1 | 5/2004 | Mann et al. |
| 6,745,221 B1 | 6/2004 | Ronca |
| 6,745,327 B1 | 6/2004 | Messing |
| 6,748,374 B1 | 6/2004 | Madan et al. |
| 6,748,447 B1 | 6/2004 | Basani et al. |
| 6,748,569 B1 | 6/2004 | Brooke et al. |
| 6,751,797 B1 | 6/2004 | Desgranges et al. |
| 6,754,696 B1 | 6/2004 | Kamath et al. |
| 6,754,702 B1 | 6/2004 | Kennelly et al. |
| 6,757,720 B1 | 6/2004 | Wechsler, Jr. |
| 7,708,131 | 6/2004 | Craig et al. |
| 6,760,750 B1 | 7/2004 | Boneh et al. |
| 6,763,370 B1 | 7/2004 | Schmeidler et al. |
| 6,765,864 B1 | 7/2004 | Natarajan et al. |
| 6,768,988 B2 | 7/2004 | Boreham et al. |
| 6,769,000 B1 | 7/2004 | Akhtar et al. |
| 6,772,214 B1 | 8/2004 | McClain et al. |
| 6,775,704 B1 | 8/2004 | Watson et al. |
| 6,775,782 B1 | 8/2004 | Buros et al. |
| 6,779,120 B1 | 8/2004 | Valente et al. |
| 6,782,379 B2 | 8/2004 | Lee |
| 6,785,686 B2 | 8/2004 | Boreham et al. |
| 6,785,726 B1 | 8/2004 | Freeman et al. |
| 6,791,949 B1 | 9/2004 | Ryu et al. |
| 6,804,221 B1 | 10/2004 | Magret et al. |
| 6,816,871 B2 * | 11/2004 | Lee ............... 707/104.1 |
| 6,823,513 B1 | 11/2004 | McNally et al. |
| 6,839,680 B1 | 1/2005 | Liu et al. |
| 6,839,701 B1 | 1/2005 | Baer et al. |
| 6,842,863 B1 | 1/2005 | Fox et al. |
| 6,851,054 B2 | 2/2005 | Wheeler et al. |
| 6,854,016 B1 | 2/2005 | Kraenzel et al. |
| 6,859,783 B2 | 2/2005 | Cogger et al. |
| 6,859,823 B1 | 2/2005 | Nishihara et al. |
| 6,859,834 B1 | 2/2005 | Arora et al. |
| 6,868,406 B1 | 3/2005 | Ogg et al. |
| 6,879,995 B1 | 4/2005 | Chinta et al. |
| 6,880,086 B2 | 4/2005 | Kidder et al. |
| 6,886,170 B1 | 4/2005 | Bahrs et al. |
| 6,901,433 B2 | 5/2005 | San Andres et al. |
| 6,901,588 B1 | 5/2005 | Krapf et al. |
| 6,948,135 B1 | 9/2005 | Ruthfield et al. |
| 6,957,237 B1 | 10/2005 | Traversat et al. |
| 6,959,415 B1 | 10/2005 | Soderberg et al. |
| 6,968,503 B1 | 11/2005 | Chang et al. |
| 6,970,862 B2 | 11/2005 | Kwan |
| 6,985,912 B2 | 1/2006 | Mullins et al. |
| 6,986,138 B1 | 1/2006 | Sakaguchi et al. |
| 6,999,956 B2 | 2/2006 | Mullins |
| 7,003,587 B1 | 2/2006 | Battat et al. |
| 7,013,435 B2 | 3/2006 | Gallo et al. |
| 7,013,469 B2 | 3/2006 | Smith et al. |
| 7,035,926 B1 | 4/2006 | Cohen et al. |
| 7,039,871 B2 * | 5/2006 | Cronk ............... 715/741 |
| 7,069,330 B1 | 6/2006 | McArdle et al. |
| 7,080,077 B2 | 7/2006 | Ramamurthy et al. |
| 7,107,260 B2 * | 9/2006 | Nakamura et al. ........... 707/3 |
| 7,107,526 B1 | 9/2006 | Weller |
| 7,114,037 B2 | 9/2006 | Agarwal et al. |
| 7,120,914 B1 | 10/2006 | Manthos et al. |
| 7,124,203 B2 | 10/2006 | Joshi et al. |
| 7,124,354 B1 | 10/2006 | Ramani et al. |
| 7,134,137 B2 | 11/2006 | Joshi et al. |
| 7,185,364 B2 | 2/2007 | Knouse |
| 7,194,764 B2 | 3/2007 | Martherus |
| 7,213,249 B2 | 5/2007 | Tung Loo et al. |
| 7,216,163 B2 | 5/2007 | Sinn |
| 7,231,661 B1 | 6/2007 | Villavicencio |
| 7,249,369 B2 | 7/2007 | Knouse |
| 7,266,595 B1 | 9/2007 | Black et al. |
| 7,340,447 B2 | 3/2008 | Ghatare |
| 7,349,912 B2 | 3/2008 | Delany et al. |
| 7,363,339 B2 | 4/2008 | Delany et al. |
| 7,380,008 B2 | 5/2008 | Teng et al. |
| 7,398,311 B2 | 7/2008 | Joshi et al. |
| 2001/0002485 A1 | 5/2001 | Bisbee et al. |
| 2001/0007133 A1 | 7/2001 | Moriconi et al. |
| 2001/0023440 A1 | 9/2001 | Franklin et al. |
| 2001/0027439 A1 | 10/2001 | Holtzman et al. |
| 2001/0037469 A1 | 11/2001 | Gupta et al. |
| 2001/0049770 A1 | 12/2001 | Cai et al. |
| 2001/0054153 A1 | 12/2001 | Wheeler et al. |
| 2002/0023132 A1 | 2/2002 | Tornabene et al. |
| 2002/0026563 A1 | 2/2002 | Chamberlain et al. |
| 2002/0032684 A1 | 3/2002 | Kobayashi et al. |
| 2002/0038306 A1 | 3/2002 | Griffin et al. |
| 2002/0049749 A1 | 4/2002 | Helgeson et al. |
| 2002/0053023 A1 | 5/2002 | Patterson et al. |
| 2002/0062435 A1 | 5/2002 | Nemirovsky et al. |
| 2002/0065701 A1 | 5/2002 | Kim et al. |
| 2002/0066033 A1 | 5/2002 | Dobbins et al. |
| 2002/0067370 A1 | 6/2002 | Forney et al. |
| 2002/0073180 A1 | 6/2002 | Dewhurst et al. |
| 2002/0078032 A1 | 6/2002 | Shi et al. |
| 2002/0078307 A1 | 6/2002 | Zahir |
| 2002/0082881 A1 | 6/2002 | Price et al. |
| 2002/0083178 A1 | 6/2002 | Brothers |
| 2002/0091745 A1 | 7/2002 | Ramamurthy et al. |
| 2002/0091798 A1 | 7/2002 | Joshi et al. |
| 2002/0091836 A1 | 7/2002 | Moetteli |
| 2002/0099671 A1 | 7/2002 | Mastin Crosbie et al. |
| 2002/0099822 A1 | 7/2002 | Rubin et al. |
| 2002/0103785 A1 | 8/2002 | Harvey |
| 2002/0103819 A1 | 8/2002 | Duvillier et al. |
| 2002/0107828 A1 | 8/2002 | Harvey |
| 2002/0108003 A1 | 8/2002 | Ellis et al. |
| 2002/0112083 A1 | 8/2002 | Joshi et al. |
| 2002/0112155 A1 | 8/2002 | Martherus et al. |
| 2002/0112185 A1 | 8/2002 | Hodges |
| 2002/0116642 A1 | 8/2002 | Joshi et al. |
| 2002/0120599 A1 | 8/2002 | Knouse et al. |
| 2002/0129024 A1 | 9/2002 | Lee |
| 2002/0129116 A1 | 9/2002 | Humphrey |
| 2002/0129135 A1 | 9/2002 | Delany et al. |
| 2002/0129177 A1 | 9/2002 | McGuire et al. |
| 2002/0133516 A1 | 9/2002 | Davis et al. |
| 2002/0138543 A1 | 9/2002 | Teng et al. |
| 2002/0138572 A1 | 9/2002 | Delany et al. |
| 2002/0138577 A1 | 9/2002 | Teng et al. |
| 2002/0138763 A1 | 9/2002 | Delany et al. |
| 2002/0143865 A1 | 10/2002 | Tung Loo et al. |
| 2002/0143943 A1 | 10/2002 | Lee et al. |
| 2002/0143949 A1 | 10/2002 | Rajarajan et al. |
| 2002/0147746 A1 | 10/2002 | Lee |
| 2002/0147801 A1 | 10/2002 | Gullotta et al. |
| 2002/0147813 A1 | 10/2002 | Teng et al. |
| 2002/0152244 A1 | 10/2002 | Dean et al. |
| 2002/0152254 A1 | 10/2002 | Teng |
| 2002/0156879 A1 | 10/2002 | Delany et al. |
| 2002/0161766 A1 | 10/2002 | Lawson et al. |
| 2002/0165960 A1 | 11/2002 | Chan |
| 2002/0166049 A1 | 11/2002 | Sinn |
| 2002/0169767 A1 | 11/2002 | Harvey |
| 2002/0174238 A1 | 11/2002 | Sinn et al. |
| 2002/0184444 A1 | 12/2002 | Shandony |
| 2003/0014442 A1 | 1/2003 | Shiigi et al. |
| 2003/0028752 A1 | 2/2003 | Fu et al. |
| 2003/0037052 A1 | 2/2003 | Kitain et al. |
| 2003/0046266 A1 | 3/2003 | Mullins et al. |
| 2003/0055762 A1 | 3/2003 | Holt |
| 2003/0055806 A1 | 3/2003 | Wong et al. |
| 2003/0061272 A1 | 3/2003 | Krisnamurthy et al. |
| 2003/0065558 A1 | 4/2003 | Shaw et al. |
| 2003/0065921 A1 | 4/2003 | Chang |
| 2003/0074580 A1 | 4/2003 | Knouse et al. |

| | | |
|---|---|---|
| 2003/0083908 A1 | 5/2003 | Steinmann |
| 2003/0088708 A1 | 5/2003 | Lewallen |
| 2003/0097380 A1 | 5/2003 | Mulhern et al. |
| 2003/0105654 A1 | 6/2003 | Macleod et al. |
| 2003/0105733 A1 | 6/2003 | Boreham et al. |
| 2003/0105742 A1 | 6/2003 | Boreham et al. |
| 2003/0110376 A1 | 6/2003 | Wiener et al. |
| 2003/0115196 A1 | 6/2003 | Boreham et al. |
| 2003/0115548 A1 | 6/2003 | Melgar |
| 2003/0120593 A1 | 6/2003 | Bansal et al. |
| 2003/0120601 A1 | 6/2003 | Ouye et al. |
| 2003/0144982 A1 | 7/2003 | Reulein et al. |
| 2003/0145074 A1 | 7/2003 | Penick |
| 2003/0149737 A1 | 8/2003 | Lambert et al. |
| 2003/0158897 A1 | 8/2003 | Ben-Natan et al. |
| 2003/0191846 A1 | 10/2003 | Hunnicutt et al. |
| 2003/0204481 A1 | 10/2003 | Lau |
| 2003/0208397 A1 | 11/2003 | VanDusen |
| 2003/0217101 A1 | 11/2003 | Sinn |
| 2003/0217127 A1 | 11/2003 | Sinn |
| 2003/0217333 A1 | 11/2003 | Smith et al. |
| 2004/0002903 A1 | 1/2004 | Stolfo et al. |
| 2004/0003351 A1 | 1/2004 | Sommerer et al. |
| 2004/0010514 A1 | 1/2004 | Agarwal et al. |
| 2004/0010519 A1 | 1/2004 | Sinn et al. |
| 2004/0010520 A1 | 1/2004 | Tsang et al. |
| 2004/0010591 A1 | 1/2004 | Sinn et al. |
| 2004/0010606 A1 | 1/2004 | Delaney et al. |
| 2004/0010607 A1 | 1/2004 | Lee et al. |
| 2004/0010665 A1 | 1/2004 | Agarwal et al. |
| 2004/0010791 A1 | 1/2004 | Jain et al. |
| 2004/0024762 A1 | 2/2004 | Agarwal et al. |
| 2004/0044623 A1 | 3/2004 | Wake et al. |
| 2004/0049675 A1 | 3/2004 | Micali et al. |
| 2004/0064356 A1 | 4/2004 | Saito et al. |
| 2004/0153509 A1 | 8/2004 | Alcorn et al. |
| 2005/0015340 A1 | 1/2005 | Maes |
| 2005/0080766 A1 | 4/2005 | Ghatare |
| 2005/0080791 A1 | 4/2005 | Ghatare |
| 2005/0080792 A1 | 4/2005 | Ghatare |
| 2005/0240490 A1 | 10/2005 | Mackey |
| 2006/0159109 A1 | 7/2006 | Lamkin et al. |
| 2006/0195575 A1 | 8/2006 | Delany |

OTHER PUBLICATIONS

Cholter, William La et al., "IBAN: Intrusion Blocker Based On Active Networks," Proceedings of the DARPA Active Networks Conference and Exposition (DANCE'02), 11 pages, 2002.
Cooney, Michael, "IBM Rolls Out Host- And Server-Based Mgmt. Apps," Network World, vol. 12, Issue 6, pp. 6-7, Feb. 6, 1995.
"DNS—Contents," http://www2.rad.com/networks/1998/dns/main.htm, 15 pages, Dec. 7, 1999.
Easter, C., "Method To Report Access Control Of LAN Server Resources On A Per User Basis," IBM Technical Disclosure Bulletin, p. 172, Apr. 1992.
Good, G., "The LDAP Data Interchange Format (LDIF)—Technical Specification," RFC 2849, 14 pages, Jun. 2000.
Hayes, Jeff, "Policy-Based Authentication And Authorization: Secure Access To The Network Infrastructure," IEEE, pp. 328-333, 2000.
Hewlett-Packard, "HP Introduces Next-Generation Web Authorization Products For E-Business," Press Release, 3 pages, Jan. 18, 1999.
Hewlett-Packard, "HP Introduces Security For Microsoft NT Extranets, Portals And E-Services," Press Release, 3 pages, Jan. 17, 2000.
Hewlett-Packard, "HP Provides Unprecedented Range Of Authentication Options," Press Release, 3 pages, Sep. 1, 1999.
Hitchens, Michael et al., "Design Choices for Symmetric Key Based Inter-domain Authentication Protocols in Distributed Systems," Computer Security Applications Conference, 1996., 12th Annual Dec. 9-13, 1996; pp. 105-116.
Hodges, J. et al., "Lightweight Directory Access Protocol (v3): Extension For Transport Layer Security," RFC 2830, 12 pages, May 2000.
Howard, L., "An Approach For Using LDAP As A Network Information Service," RFC 2307, 20 pages, Mar. 1998.
Howes, Timothy A. et al., "Understanding And Deploying LDAP Directory Services," Netscape Communications Corporation, pp. 2 cover pages, 102-105, 277-292 and 699-723, 1999.
Hsu, Chun-Nan et al., "Reformulating Query Plans For Multidatabase Systems," ACM, pp. 423-432, 1993.
Janis, Reference Monitor-Creating Group Membership, IBM Technical Disclosure Bulletin, p. 431, Mar. 1990.
Kaluskar, Sanjay et al., "Rules Evaluation In Oracle9i," Oracle Corporation, 10 pages, no date.
Kim, Hahnsang et al., "Improving Cross-domain Authentication over Wirsless Local Area Networks," Security and Privacy for Emerging Areas in Communications Networks, 2005 (SecureComm 2005; First International Conference on Sep. 5-9, 2005 pp. 127-138.
Kim, K.H., "APIs for Real-Time Diistributed Object Programming", Coputer, IEEE Jun. 2000, pp. 72-80.
Laird, P. D., "Comment On 'An Optimal Evaluation Of Boolean Expressions In An Online Query System'," Communications of the ACM, vol. 22, No. 10, pp. 549-550, Oct. 1979.
Lakshmanan, Laks V. S. et al., "SchemaSQL-An Extension To SQL For Multidatabase Interoperability," ACM Transactions on Database Systems, vol. 26, No. 4, pp. 476-519, Dec. 2001.
Leon, Mark, "McAfee's NetTools Promises To Ease Network Desktop Diagnosis," InfoWorld, vol. 17, Issue 30, p. 53, Jul. 24, 1995.
Lim, Ee-Peng et al., "Query Optimization And Processing In Federated Database Systems," ACM, pp. 720-722, 1993.
Lin, Whe Dar et al., "A Wireless-based Authentication and Anonymous Channels for Large-Scale Area," Computers and Communications, 2001; Proceedings; Sixth IEEE Symposium on Jul. 3-5, 2001; pp. 36-41.
Luciani, J. et al., "Server Cache Synchronization Protocol (SCSP)," RFC 2334, 39 pages, Apr. 1998.
McHugh, Jason et al., "Integrating Dynamically-Fetched External Information Into A DBMS For Semistructured Data," Department of Computer Science, Stanford University, 8 pages, no date.
McLellan, et al., "Building More Usable APIs", IEEE Software, pp. 78-86, May/Jun. 1998.
Mwakalinga, Jeffy et al., "Authorization System in Open Networks based on Attribute Certificates," http://www.dsv.su.se/-matei/courses/3%20-%202i1272/L3b.pdf. 17 pages, printed date Feb. 20, 2007.
Microsoft, "Microsoft's Vision for an Identity Metasystem", Microsoft Corporation, http://www.identityblog.com/stories/2005/07/05/IdentityMetasystem.htm, printed date Oct. 6, 2006, 9 pages.
Musthaler, Linda, "The Trouble With Help Desk Selection," Network World, vol. 12, Issue 8, pp. 35-39, Feb. 20, 1995.
Myers, M. et al., "X.509 Internet Public Key Infrastructure Online Certificate Status Protocol—OCSP," The Internat Society, 22 pages, Jun. 1999.
Netegrity Inc., "SiteMinder Agent Operations Guide," Version 4.0, pp. 1-174, 1997.
Netegrity Inc., "SiteMinder Deployment Guide," Version 4.0, pp. 1-314, 1997.
Netegrity Inc., "SiteMinder Developer's API Guide," Version 4.0, pp. 1-368, 1997.
Netegrity Inc., "SiteMinder Installation Guide," Version 4.0, pp. 1-280, 1997.
Netegrity Inc., "SiteMinder Policy Server Operations Guide," Version 4.0, pp. 1-556, 1997.
Netscape Communications Corporation, "Introduction To SSL," http://developer.netscape.com/docs/manuals/security/sslin/contents.htm, 12 pages, Oct. 9, 1998.
Oblix, Inc., "Oblix CSA Solution Administration Guide," Version 3.5, 328 pages, 1999.
Park, Joon S. et al., "Secure Cookies On The Web," IEEE Internet Computing, pp. 36-44, Jul./Aug. 2002.
PC Pro, "Identity Systems", http://research.pcpro.co.uk/detail/ORG/1139341311_744.html, printed dated Oct. 6, 2006, 2 pages.

Pfitzmann, Birgit et al., "Analysis Of Liberty Single-Sign-On With Enabled Clients," IEEE Internet Computing, pp. 38-44, Nov./Dec. 2003.

Phipatanasuphom, Veradej et al., "Vulnerability Of Sensor Networks To Unauthorized Traversal And Monitoring," IEEE Transactions on Computers, vol. 53, No. 3, pp. 364-369, Mar. 2004.

Piscitello, David M. et al., "Project Guards Laptop And Desktop Data," InfoWorld, pp. 48 and 54, Jun. 21, 1999.

Prasad, CK, "Distributing Sun Java System Identity Server Applications Using Java Web Start", Article Index, Apr. 2004, 8 pages.

Saba—Products, Saba Enterprise 5, dated 1997-2006, 2 pages.

Saba—Company, dated 1997-2006, 1 page.

Saba—Solutions, Competency-Driven HCM, dated 1997-2006, 1 page.

Saba—Talent, dated 1997-2006, 2 pages.

Saba—Collaboration, dated 1997-2006, 1 page.

Schmersal, Frank, "Testing To Maintain Service Standards," Communications News, vol. 35, Issue 3, pp. 22-23, Mar. 1998.

Securant Technologies, Inc., "Clear Trust, Unified Access Management," pp. 1-23, 1997.

Sheth, Amit et al., "Federated Database Systems," ACM Computing Surveys, vol. 22, No. 3, pp. 201-236, Sep. 1990.

Shi, S. S. B. et al., "An Enterprise Directory Solution With DB2," IBM Systems Journal, vol. 39, No. 2, pp. 360-383, 2000.

Skaggs, B. et al., "Network Vulnerability Analysis," IEEE, pp. III-493-III-495, 2002.

Stets, et al., "Component-Based APIs for Versioning and Distributed Applications", IEEE, pp. 54-61, 1999.

Stokes, E. et al., "Access Control Requirements For LDAP," RFC 2820, 9 pages, May 2000.

Stonebraker, Michael et al., "On Rules, Procedures, Caching And Views In Data Base Systems," EECS Department, University of California, Berkeley, pp. 1-18, no date.

Sun Microsystems, Inc., "Appendix B—ACL File Syntax," iPlanet Web Server: FastTrack Edition Administrator's Guide, 7 pages, Jul. 13, 2000.

Sun Microsystems, Inc., "Chapter 2—Syntax And Use Of obj.conf," iPlanet Web Server, FastTrack Edition NSAPI Programmer's Guide, 16 pages, Jul. 20, 2000.

Sun Microsystems, Inc., "Chapter 12—Controlling Access To Your Server," iPlanet Web Server: FastTrack Edition Administrator's Guide, 24 pages, Jul. 13, 2000.

U.S. Appl. No. 09/570,276, Office Action dated Nov. 14, 2006, 28 pages.

U.S. Appl. No. 09/792,911, Office Action dated Sep. 9, 2004, 18 pages.

U.S. Appl. No. 09/792,911, Final Office Action dated May 9, 2005, 17 pages.

U.S. Appl. No. 09/792,911, Advisory Action dated Aug. 9, 2005, 3 pages.

U.S. Appl. No. 09/792,911, Office Action dated Dec. 2, 2005, 13 pages.

U.S. Appl. No. 09/792,915, Office Action dated Jul. 23, 2004, 17 pages.

U.S. Appl. No. 09/792,915, Final Office Action dated Mar. 8, 2005, 19 pages.

U.S. Appl. No. 09/792,915, Final Office Action dated Jun. 30, 2005, 18 pages.

U.S. Appl. No. 09/792,915, Office Action dated Oct. 4, 2005, 17 pages.

U.S. Appl. No. 09/792,918, Office Action dated Sep. 8, 2004, 22 pages.

U.S. Appl. No. 09/792,918, Final Office Action dated Jun. 21, 2005, 16 pages.

U.S. Appl. No. 09/792,918, Advisory Action dated Sep. 20, 2005, 3 pages.

U.S. Appl. No. 09/792,934, Office Action dated Sep. 21, 2004, 19 pages.

U.S. Appl. No. 09/792,934, Final Office Action dated Jun. 2, 2005, 10 pages.

U.S. Appl. No. 09/792,934, Office Action dated Aug. 19, 2005, 5 pages.

U.S. Appl. No. 09/793,196, Office Action dated Jul. 14, 2004, 19 pages.

U.S. Appl. No. 09/793,196, Final Office Action dated Mar. 8, 2005, 15 pages.

U.S. Appl. No. 09/793,196, Advisory Action dated Jul. 21, 2005, 3 pages.

U.S. Appl. No. 09/793,196, Office Action dated Dec. 13, 2005, 12 pages.

U.S. Appl. No. 09/793,196, Final Office Action dated May 31, 2006, 22 pages.

U.S. Appl. No. 09/793,196, Office Action dated Nov. 21, 2006, 11 pages.

U.S. Appl. No. 09/793,320, Office Action dated Aug. 4, 2004, 18 pages.

U.S. Appl. No. 09/793,320, Final Office Action dated May 10, 2005, 19 pages.

U.S. Appl. No. 09/793,320, Office Action dated Sep. 20, 2005, 15 pages.

U.S. Appl. No. 09/793,320, Final Office Action dated Mar. 17, 2008, 18 pages.

U.S. Appl. No. 09/793,354, Office Action dated Oct. 1, 2003, 12 pages.

U.S. Appl. No. 09/793,354, Final Office Action dated Apr. 19, 2004, 15 pages.

U.S. Appl. No. 09/793,354, Office Action dated Jan. 4, 2005, 11 pages.

U.S. Appl. No. 09/793,354, Final Office Action dated Aug. 26, 2005, 9 pages.

U.S. Appl. No. 09/793,354, Advisory Action dated Dec. 15, 2005, 3 pages.

U.S. Appl. No. 09/793,355, Office Action dated Mar. 12, 2004, 13 pages.

U.S. Appl. No. 09/793,355, Final Office Action dated Apr. 6, 2005, 16 pages.

U.S. Appl. No. 09/793,355, Advisory Action dated Jun. 21, 2005, 7 pages.

U.S. Appl. No. 09/793,355, Office Action dated Sep. 7, 2005, 13 pages.

U.S. Appl. No. 09/793,658, Office Action dated Sep. 9, 2004, 14 pages.

U.S. Appl. No. 09/793,658, Final Office Action dated Nov. 2, 2005, 16 pages.

U.S. Appl. No. 09/793,658, Advisory Action dated Jan. 31, 2006, 3 pages.

U.S. Appl. No. 09/814,091, Office Action dated Jul. 14, 2004, 22 pages.

U.S. Appl. No. 09/814,091, Final Office Action dated Apr. 8, 2005, 24 pages.

U.S. Appl. No. 09/814,091, Advisory Action dated Jul. 5, 2005, 3 pages.

U.S. Appl. No. 09/814,091, Office Action dated Nov. 1, 2005, 18 pages.

U.S. Appl. No. 09/814,091, Office Action dated May 3, 2006, 7 pages.

U.S. Appl. No. 09/886,515, Office Action dated Dec. 28, 2004, 35 pages.

U.S. Appl. No. 09/886,515, Office Action dated Aug. 29, 2005, 35 pages.

U.S. Appl. No. 09/886,515, Final Office Action dated Feb. 14, 2006, 36 pages.

U.S. Appl. No. 09/997,408, Office Action dated Sep. 7, 2005, 11 pages.

U.S. Appl. No. 09/997,408, Final Office Action dated Feb. 15, 2006, 7 pages.

U.S. Appl. No. 09/997,408, Office Action dated Aug. 7, 15 pages.

U.S. Appl. No. 09/997,409, Office Action dated Jun. 3, 2005, 17 pages.

U.S. Appl. No. 09/997,409, Office Action dated Nov. 7, 2005, 12 pages.

U.S. Appl. No. 09/997,409, Office Action dated May 3, 2006, 9 pages.

U.S. Appl. No. 09/997,409, Office Action dated Oct. 20, 2006, 9 pages.

U.S. Appl. No. 09/998,893, Office Action dated Jun. 13, 2005, 20 pages.
U.S. Appl. No. 09/998,893, Final Office Action dated Dec. 28, 2005, 12 pages.
U.S. Appl. No. 09/998,893, Office Action dated Jul. 17, 2006, 17 pages.
U.S. Appl. No. 09/998,893, Final Office Action dated Jan. 4, 2007, 12 pages.
U.S. Appl. No. 09/998,895, Office Action dated Mar. 25, 2005, 18 pages.
U.S. Appl. No. 09/998,895, Final Office Action dated Aug. 1, 2005, 19 pages.
U.S. Appl. No. 09/998,895, Advisory Action dated Oct. 20, 2005, 3 pages.
U.S. Appl. No. 09/998,895, Office Action dated Feb. 7, 2006, 13 pages.
U.S. Appl. No. 09/998,895, Final Office Action dated Jul. 20, 2006, 22 pages.
U.S. Appl. No. 09/998,895, Final Office Action dated Jan. 18, 2007, 17 pages.
U.S. Appl. No. 09/998,898, Office Action dated Sep. 21, 2005, 13 pages.
U.S. Appl. No. 09/998,898, Office Action dated Mar. 28, 2006, 7 pages.
U.S. Appl. No. 09/998,898, Advisory Office Action dated Dec. 29, 2006, 3 pages.
U.S. Appl. No. 09/998,898, Office Action dated Mar. 7, 2007, 10 pages.
U.S. Appl. No. 09/998,908, Office Action dated Jan. 25, 2005, 24 pages.
U.S. Appl. No. 09/998,908, Final Office Action dated Aug. 22, 2005, 14 pages.
U.S. Appl. No. 09/998,908, Advisory Action dated Nov. 1, 2005, 3 pages.
U.S. Appl. No. 09/998,908, Office Action dated Feb. 16, 2006, 15 pages.
U.S. Appl. No. 09/998,908, Final Office Action dated Aug. 22, 2006, 25 pages.
U.S. Appl. No. 09/998,910, Office Action dated Jan. 28, 2005, 12 pages.
U.S. Appl. No. 09/998,910, Office Action dated Dec. 13, 2005, 10 pages.
U.S. Appl. No. 09/998,910, Final Office Action dated Feb. 14, 2007, 15 pages.
U.S. Appl. No. 09/998,914, Office Action dated Jul. 14, 2005, 19 pages.
U.S. Appl. No. 09/998,914, Final Office Action dated Jan. 30, 2006, 15 pages.
U.S. Appl. No. 09/998,914, Final Office Action dated Feb. 16, 2007, 13 pages.
U.S. Appl. No. 09/998,916, Office Action dated Mar. 21, 2005, 16 pages.
U.S. Appl. No. 09/998,916, Final Office Action dated Sep. 8, 2005, 12 pages.
U.S. Appl. No. 09/998,916, Advisory Action dated Dec. 9, 2005, 4 pages.
U.S. Appl. No. 09/998,916, Advisory Action dated Apr. 5, 2006, 11 pages.
U.S. Appl. No. 09/998,916, Office Action dated Sep. 5, 2006, 20 pages.
U.S. Appl. No. 09/998,916, Office Action dated Feb. 23, 2007 12 pages.
U.S. Appl. No. 09/998,926, Office Action dated Aug. 25, 2005, 26 pages.
U.S. Appl. No. 09/998,926, Final Office Action dated Feb. 27, 2006, 15 pages.
U.S. Appl. No. 09/998,926, Office Action dated Sep. 11, 2006, 19 pages.
U.S. Appl. No. 09/998,926, Office Action dated Feb. 26, 2007, 16 pages.
U.S. Appl. No. 09/999,074, Office Action dated Mar. 24, 2005, 24 pages.
U.S. Appl. No. 09/999,074, Final Office Action dated Sep. 20, 2005, 19 pages.
U.S. Appl. No. 09/999,074, Advisory Action dated Dec. 20, 2005, 3 pages.
U.S. Appl. No. 09/999,177, Office Action dated Mar. 25, 2005, 23 pages.
U.S. Appl. No. 09/999,177, Final Office Action dated Sep. 14, 2005, 26 pages.
U.S. Appl. No. 09/999,177, Advisory Action dated Dec. 14, 2005, 6 pages.
U.S. Appl. No. 10/145,684, Office Action dated Jun. 16, 2005, 17 pages.
U.S. Appl. No. 10/145,684, Final Office Action dated Dec. 1, 2005, 10 pages.
U.S. Appl. No. 10/145,684, Advisory Action dated Mar. 9, 2006, 3 pages.
U.S. Appl. No. 10/145,684, Office Action dated Jun. 30, 2006, 25 pages.
U.S. Appl. No. 10/146,150, Office Action dated Jul. 27, 2005, 17 pages
U.S. Appl. No. 10/146,150, Final Office Action dated Dec. 20, 2005, 12 pages.
U.S. Appl. No. 10/146,150, Advisory Action dated Mar. 13, 2006, 4 pages.
U.S. Appl. No. 10/146,150, Office Action dated May 30, 2006, 18 pages.
U.S. Appl. No. 10/146,150, Advisory Office Action dated Dec. 5, 2006, 13 pages.
U.S. Appl. No. 10/314,888, Office Action dated Jan. 26, 2006, 31 pages.
U.S. Appl. No. 10/314,888, Office Action dated Jul. 26, 2006, 26 pages.
U.S. Appl. No. 10/314,888, Office Action dated Feb. 9, 2007, 34 pages.
U.S. Appl. No. 10/325,465, Office Action dated Sep. 19, 2006, 25 pages.
U.S. Appl. No. 10/325,607, Office Action dated Feb. 13, 2006, 5 pages.
U.S. Appl. No. 10/325,607, Office Action dated Apr. 18, 2006, 33 pages.
U.S. Appl. No. 10/328,920, Office Action dated May 31, 2006, 20 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/345,879, Office Action dated Oct. 5, 2006, 30 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,913, Office Action dated May 12, 2006, 16 pages.
U.S. Appl. No. 10/354,914, Office Action dated Aug. 1, 2005, 15 pages.
U.S. Appl. No. 10/354,914, Final Office Action dated Feb. 10, 2006, 16 pages.
U.S. Appl. No. 10/682,252, Office Action dated Apr. 19, 2006, 28 pages.
U.S. Appl. No. 10/682,330, Office Action dated Apr. 17, 2006, 26 pages.
U.S. Appl. No. 10/682,330, Advisory Office Action dated Dec. 12, 2006, 3 pages.
U.S. Appl. No. 10/682,575, Office Action dated Apr. 17, 2006, 31 pages.
U.S. Appl. No. 10/682,575, Office Action dated Dec. 12, 2006, 3 pages.

Wahl, M. et al., "Authentication Methods For LDAP," RFC 2829, 16 pages, May 2000.
Wahl, M. et al., "Lightweight Directory Access Protocol (v3)," RFC 2251, 48 pages, Dec. 1997.
Wahl, M., "Informed Control Enabling Identity Interoperability", http://www.ldap.com/1/commentary/wahl/20050203_01.shtml, Feb. 3, 2005, 3 pages.
Walsh, Jeff, "Remedy Releases Three Applications For Help-Desk Suite," InfoWorld, vol. 19, Issue 16, p. 34, Apr. 21, 1997.
Wu, Kun-Lung et al., "Personalization With Dynamic Profiler," IEEE, pp. 12-20, 2001.
Wyss, Catharine et al., "A Relational Algebra For Data/Metadata Integration In A Federated Database System," ACM, pp. 65-72, 2001.
Yaacovi, Y. et al., "Lightweight Directory Access Protocol (v3): Extensions For Dynamic Directory Services," RFC 2589, 12 pages, May 1999.
U.S. Appl. No. 09/793,320, Advisory Action dated Jun. 7, 2006, 5 pages.
U.S. Appl. No. 09/793,320, Examiner's Reply Brief dated Mar. 7, 2007.
U.S. Appl. No. 09/793,355, Final Office Action dated Feb. 9, 2005, 15 pages.
U.S. Appl. No. 09/793,355, Advisory Action dated May 2, 2006, 3 pages.
U.S. Appl. No. 09/886,515, Office Action dated Sep. 7, 2006, 43 pages.
U.S. Appl. No. 11/542,311, Office Action dated Jun. 8, 2007, 25 pages.
U.S. Appl. No. 11/542,311, Final Office Action dated Sep. 11, 2007, 14 pages.
U.S. Appl. No. 11/542,311, Notice of Allowance dated Feb. 11, 2008, 7 pages.
Batory, Don et al., "Reengineering A Complex Application Using A Scalable Data Structure Compiler," ACM, pp. 111-120, 1994.
Bentley, Jon Louis et al., "Data Structures For Range Searching," Computing Surveys, vol. 11, No. 4, pp. 397-409, Dec. 1979.
Blakeley, Jose A., "Universal data access with OLE DB", Microsoft Corporation, Feb. 23, 1997, pp. 2-7, ISBN: 0-8186-7804-6, 1063-6390/97—Compcon 1997 Proceedings, 1997 IEEE Computer Society, US.
Braumandl, Reinhard et al., "Evaluating Functional Joins Along Nested Reference Sets In Objects-Relational And Object-Oriented Databases," Proceedings of the 24th VLDB Conference, pp. 110-121, 1998.
Chaudhuri, S., et al., "An Overview of Data Warehousing and OLAP Technology," SIGMOD Record, vol. 26, No. 1, pp. 65-74, 2000.
Chen, Peter Pin-Shan, "The Entity-Relationship Model-Toward A Unified View Of Data," ACM Transactions on Database Systems, vol. 1, No. 1, pp. 9-36, Mar. 1976.
Farjami, P. et al., "Advanced service provisioning based on mobile agents", Computer Communications, vol. 23, No. 8, Apr. 2000, Elsevier Science B.V., pp. 754-760.
Florescu, Daniela, et al., "A Performance Evaluation of Alternative Mapping Schemes for Storing XML Data in a Relational Database," Technical Report, INRIA, France, May 1999, pp. 1-3.
Foster, Ian et al., "A Security Architecture for Computational Grids", XP-002473964, 5th ACM Conference on Computer and Communication Security, ACM 1998, pp. 83-92.
Hakimpour, Farshad et al., "Resolving Semantic Heterogeneity In Schema Integration: An Ontology Based Approach," ACM, pp. 297-308, 2001.
Jung-Jang Jeng, "An Approach to Designing Reusable Service Frameworks via Virtual Service Machine," ACM, May 18-20, 2001, pp. 58-66.
Merz, Ulla et al., "Direct: A Query Facility For Multiple Databases," ACM Transactions on Information Systems, vol. 12, No. 4, pp. 339-359, Oct. 1994.
Mohri, Takao et al., "Virtual Integration of Distributed Databased by Multiple Agence", 1998. XP-002473963, S. Arakawa and H.Motoda (Eds.): D'98, LNAI 1532, pp. 413-414.
Moridera, Akio et al., "The Network Paradigm of the 21st Century and its Key Technologies", vol. 38, No. 11, Nov. 11, 2000, IEEE Communications Magazine, pp. 94-98, ISSN: 0163-6804.

Nenad Medvidovic et al., "Modeling Software Architectures in the Unified Modeling Language," ACM, Jan. 2002, pp. 2-57.
Pirahesh, Hamid et al., "Extensible/Rule Based Query Rewrite Optimization In Starburst," ACM, pp. 39-48, 1992.
Soltysiak, Stuart et al., "An Agent-Based Intelligent Distributed Information Management System for Internet Resources", XP-002473965, URL:http://isoc.org/inet2000.cdproceedings, retrieved Mar. 26, 2008.
U.S. Appl. No. 09/792,915, Advisory Action dated Jun. 23, 2006, 4 pages.
U.S. Appl. No. 09/792,915, Examiner's Reply Bried dated Mar. 7, 2007.
U.S. Appl. No. 09/792,915, Final Office Action dated Apr. 3, 2006, 22 pages.
U.S. Appl. No. 09/793,355, Appeal Brief dated Jul. 29, 2008, 31 pgs.
U.S. Appl. No. 09/793,355, Reply Brief dated Dec. 22, 2008, 6 pgs.
U.S. Appl. No. 09/793,355, Examiner's Answer to Appeal Brief dated Oct. 20, 2008, 16 pgs.
U.S. Appl. No. 09/998,908, Appeal Brief dated Mar. 9, 2007, 27 pgs.
U.S. Appl. No. 09/997,409, Advisory Action dated Jul. 12, 2006, 3 pages.
U.S. Appl. No. 09/997,409, Notice of Allowance dated Sep. 7, 2007, 20 pages.
U.S. Appl. No. 09/998,893, Advisory Action dated Mar. 28, 2006, 3 pages.
U.S. Appl. No. 09/998,893, Advisory Office Action dated Mar. 22, 2007, 6 pages.
U.S. Appl. No. 09/998,893, Final Office Action dated Feb. 6, 2008, 14 pages.
U.S. Appl. No. 09/998,893, Office Action dated Jul. 16, 2007, 11 pages.
U.S. Appl. No. 09/998,895, Advisory Action dated Apr. 10, 2007, 6 pages.
U.S. Appl. No. 09/998,895, Office Action dated Jun. 18, 2008, 22 pgs.
U.S. Appl. No. 09/998,898 Final Office Action dated May 13, 2008, 13 pgs.
U.S. Appl. No. 09/998,910, Office Action dated Sep. 27, 2006, 12 pages.
U.S. Appl. No. 09/998,910, Advisory Action dated Jul. 17, 2008, 4 pgs.
U.S. Appl. No. 09/998,910, Final Office Action dated Apr. 29, 2008, 15 pages.
U.S. Appl. No. 09/998,910; Office Action dated Oct. 7, 2008, 10 pgs.
U.S. Appl. No. 09/998,914, Advisory Action dated Apr. 19, 2006, 3 pages.
U.S. Appl. No. 09/998,914, Advisory Action dated Apr. 25, 2007, 3 pages.
U.S. Appl. No. 09/998,914, Notice of Allowance dated Nov. 28, 2007, 8 pages.
U.S. Appl. No. 09/998,914, Office Action dated Jun. 22, 2007, 14 pages.
U.S. Appl. No. 09/998,914, Office Action dated Sep. 6, 2006, 18 pages.
U.S. Appl. No. 10/314,888, Advisory Action dated May 30, 2008, 3 pages.
U.S. Appl. No. 10/314,888, Office Action dated Jul. 27, 2007, 37 pages.
U.S. Appl. No. 10/314,888, Final Office Action dated Feb. 22, 2008, 37 pages.
U.S. Appl. No. 10/325,465, Advisory Action dated Jun. 19, 2007, 3 pages.
U.S. Appl. No. 10/325,465, Final Office Action dated Apr. 4, 2007, 25 pages.
U.S. Appl. No. 10/325,465, Office Action dated Dec. 12, 2007, 20 pages.
U.S. Appl. No. 10/327,607, Office Action dated Apr. 30, 2007, 31 pages.
U.S. Appl. No. 10/327,607, Final Office Action dated Oct. 10, 2006, 33 pages.
U.S. Appl. No. 10/327,607, Notice of Allowance dated Aug. 6, 2008, 36 pages.
U.S. Appl. No. 10/327,607, Advisory Action dated Feb. 4, 2008, 3 pages.

U.S. Appl. No. 10/327,607, Final Office Action dated Nov. 16, 2007, 35 pages.
U.S. Appl. No. 10/328,920, Notice of Allowance dated Dec. 5, 2006, 8 pages.
U.S. Appl. No. 10/345,873, Notice of Allowance dated Jul. 6, 2006, 6 pages.
U.S. Appl. No. 10/345,879, Advisory Action dated Jul. 27, 2007, 5 pages.
U.S. Appl. No. 10/345,879, Final Office Action dated May 17, 2007, 39 pages.
U.S. Appl. No. 10/345,879, Office Action dated Oct. 31, 2007, 35 pages.
U.S. Appl. No. 10/345,913, Notice of Allowance dated Jun. 12, 2008, 8 pages.
U.S. Appl. No. 10/345,913, Office Action dated Feb. 7, 2008, 10 pages.
U.S. Appl. No. 10/345,914, Final Office Action dated Apr. 5, 2007, 9 pages.
U.S. Appl. No. 10/345,914, Office Action dated Sep. 22, 2006, 8 pages.
U.S. Appl. No. 10/345,914, Notice of Allowance dated Mar. 12, 2008, 11 pages.
U.S. Appl. No. 10/682,252, Office Action dated Apr. 27, 2007, 26 pages.
U.S. Appl. No. 10/682,252, Advisory Action dated Dec. 12, 2008, 3 pgs.
U.S. Appl. No. 10/682,252, Final Office Action dated Sep. 20, 2006, 25 pgs.
U.S. Appl. No. 10/682,252, Final Office Action dated Sep. 27, 20097, 23 pgs.
U.S. Appl. No. 10/682,252, Final Office Action dated Sep. 23, 2008, 24 pages.
U.S. Appl. No. 10/682,252, Office Action dated Jan. 23, 2008, 24 pages.
U.S. Appl. No. 10/682,330, Office Action dated Mar. 22, 2007, 21 pages.
U.S. Appl. No. 10/682,575, Office Action dated Mar. 27, 2007, 37 pages.
U.S. Appl. No. 10/682,575, Office Action dated Jan. 23, 2008, 28 pages.
U.S. Appl. No. 10/751,333 Office Action dated Feb. 13, 2007, 14 pages.
U.S. Appl. No. 10/866,508, Office Action dated Dec. 12, 2007, 14 pages.
U.S. Appl. No. 11/588,604, Office Action dated Jan. 24, 2008, 23 pages.
U.S. Appl. No. 11/684,796, Advisory Action dated Aug. 13, 2008, 4 pages.
U.S. Appl. No. 11/684,796, Final Office Action dated Jun. 17, 2008, 22 pages.

* cited by examiner

104₁ — 
```
cn:      en-US;    name
         fr-FR;    nom
         de-DE;    namn title:   en-US;    title
         fr-FR;    titre
         de-DE;    berufsbezeichnung salary:  en-US;    salary
         fr-FR;    paie
         de-DE;    gehalt
```

FIG. 6

102₁ — 
```
cn:      en-US;    John Smith
         fr-FR;    Jean Smith
         de-DE;    Hans Smith title:   en-US;    bank manager
         fr-FR;    gérant de banque
         de-DE;    bankdirektor salary: 100,000
```

FIG. 7

```
name:    John Smith
title:   bank manager
salary:  100,000
```

FIG. 8A

```
nom:     Jean Smith
title:   gérant de banque
paie:    100,000
```

FIG. 8B

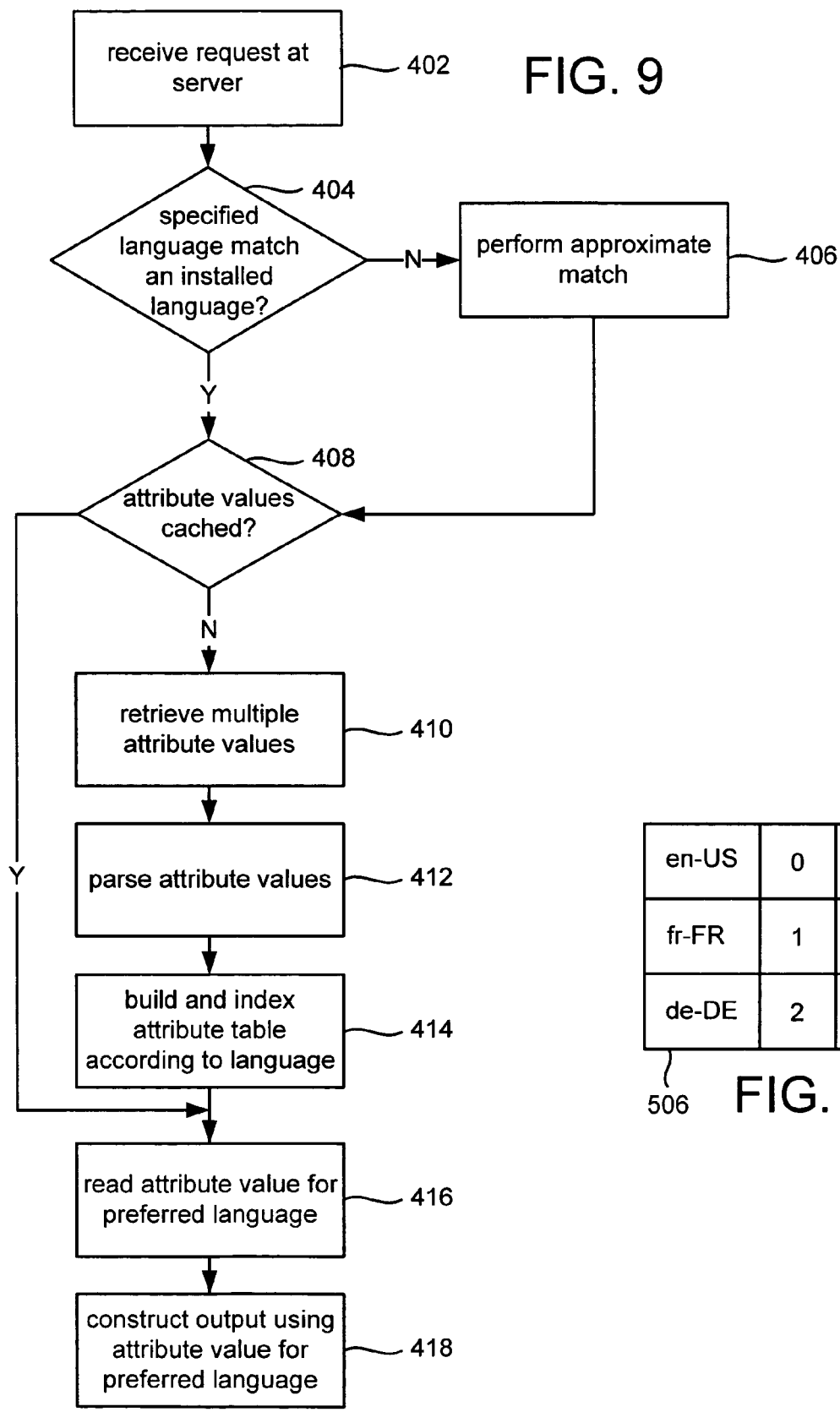

ated with a corresponding language component. A server in communication with the data store can provide outputs to requesting

MULTI-LANGUAGE SUPPORT FOR ENTERPRISE IDENTITY AND ACCESS MANAGEMENT

CROSS-REFERENCE TO RELATED APPLICATIONS

The following U.S. patent applications are incorporated by reference herein in their entirety:

U.S. patent application Ser. No. 09/793,355, entitled QUERY STRING PROCESSING, by Crosbie, et al., filed Feb. 26, 2001;

U.S. patent application Ser. No. 09/998,908, entitled SUPPORT FOR MULTIPLE DATA STORES, by Lee, et al., filed Nov. 30, 2001; and U.S. patent application Ser. No. 10/682,252, entitled TRANSLATING DATA ACCESS REQUESTS, by Ghatare, filed Oct. 9, 2003.

BACKGROUND OF THE INVENTION

1. Field of the Invention

The present invention is directed to technology for managing attributes.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things.For each entry in the data store, a set of attributes are stored. For example, the attributes stored for a user may include name, address, employee number, telephone number, email address, user identity (ID) and password.

The Identity System can also manage access privileges that govern what an entity can view, create, modify or use in the Identity System. Often, this management of access privileges is based on one or more specific attributes, membership in a group and/or association with an organization. Some users of Identity Systems also use Access Systems. An Access System provides for the authentication and authorization of users attempting to access resources. For efficiency purposes, there is an advantage to integrating the Identity System and the Access System. For example, both systems can share the same set of data stores.

As markets expand and globalization increases, identity and access management increasingly faces the attendant requirements of such globally diverse environments. Particularly, management must address different language requirements of users accessing the systems. In some systems, the requirements are addressed through the installation of multiple server configurations to handle individual languages. A first server in an Identity Management System may be installed for a first language and a second server installed for a second language. Additionally, multiple data stores may be provided to store configuration and identity data in the different languages. These solutions are costly, present detailed and complex administrative management requirements, and are only scalable by the installation of additional servers.

Accordingly, there is a need to provide multi-language support for diverse environments while addressing the shortcomings of the prior art.

SUMMARY OF THE INVENTION

Systems and methods in accordance with embodiments are provided for multi-language support through the management of multi-valued attributes. A data store maintains multi-valued attributes having language components and value components. The value components specify language specific values for the attributes and can be associated with corresponding language components. A server in communication with the data store can provide outputs to requesting users in accordance with a preferred language. For example, a request to access an identity profile maintained by an Identity System can be fulfilled by constructing a page or other output including the requested profile data. An Identity Server can construct the output to include attribute values corresponding to the preferred language associated with the request. Attribute configuration data can similarly be maintained with language components and value components. The configuration of an attribute such as its display name can be included in an output in accordance with a preferred language.

In accordance with one embodiment, a method is provided that comprises maintaining at least one multi-valued attribute at a data store. The multi-valued attribute can include a plurality of language components and value components. Each of the value components can specify a value for the attribute that is associated with a corresponding language component. The method can further comprise receiving a request associated with the attribute at a server. The request can be associated with a preferred language. A multi-valued attribute is accessed and an output generated in response to the request that includes at least one first value for the attribute that corresponds to the preferred language.

In one embodiment, the method further comprises determining the preferred language associated with the request from at least one of a Uniform Resource Locator (URL) associated with the request, a hypertext transfer protocol (HTTP) header variable associated with the request, an identity profile associated with the request, and a cookie associated with the request.

In one embodiment, a method is provided that comprises receiving a request associated with at least one multi-valued attribute. The request is associated with a preferred language. The method further comprises accessing the multi-valued attribute, which includes a plurality of language components and value components. Each of the value components specifies a value for the at least one multi-valued attribute that is associated with a corresponding language component. The method further comprises generating a response to the request, wherein the response includes at least one first value for the at least one multi-valued attribute that corresponds to the preferred language.

In one embodiment, a method is provided that includes providing at least one multi-valued attribute at a data store. The multi-valued attribute includes a plurality of language components and value components and each of the value components specifies a value for the attribute that is associated with a corresponding language component. The method further comprises generating a response to a request associated with the at least one multi-valued attribute, wherein the request is associated with a preferred language and the response includes at least one first value for the multi-valued attribute that corresponds to the preferred language.

In one embodiment, a system for managing attribute information is provided that comprises a data store that includes at least one multi-valued attribute having a plurality of language components and value components, wherein each of the value components specifies a value for the at least one multi-valued attribute that is associated with a corresponding language component. The system further comprises at least one server in communication with the data store. The at least one server accesses the multi-valued attribute to generate a response to a request associated with the at least one multi-valued attribute. The request is associated with a preferred language and the response includes at least one first value for the multi-valued attribute that corresponds to the preferred language.

Systems in accordance with embodiments can be implemented as part of Identity Systems, Access Systems, or integrated Identity and Access Systems. However, embodiments are not limited to Identity, Access, or integrated Identity and Access Systems and can be implemented as part of many other types of systems.

The present invention can be accomplished using hardware, software, or a combination of both hardware and software. The software used for the present invention is stored on one or more processor readable storage devices including hard disk drives, data compact discs (CD-ROMs), digital video disc (DVDs), optical disks, floppy disks, tape drives, random access memory (RAM), read only memory (ROM), flash memory or other suitable storage devices. In alternative embodiments, some or all of the software can be replaced by dedicated hardware including custom integrated circuits, gate arrays, field programmable gate arrays (FPGAs), programmable logic devices (PLDs), and special purpose processors. In one embodiment, software implementing the present invention is used to program one or more processors. The one or more processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 6 is an exemplary portion of configuration data including multi-valued attribute configuration data.

FIG. 7 is an exemplary identity profile including multi-valued attributes.

FIGS. 8A and 8B graphically depict exemplary outputs of a system in different languages in accordance with one embodiment.

FIG. 9 is a flow chart describing one embodiment for processing a request and providing an output according to a preferred language associated with the request.

FIG. 10 is an exemplary attribute value table in accordance with one embodiment.

DETAILED DESCRIPTION

I. Access Management System

Figure 1:
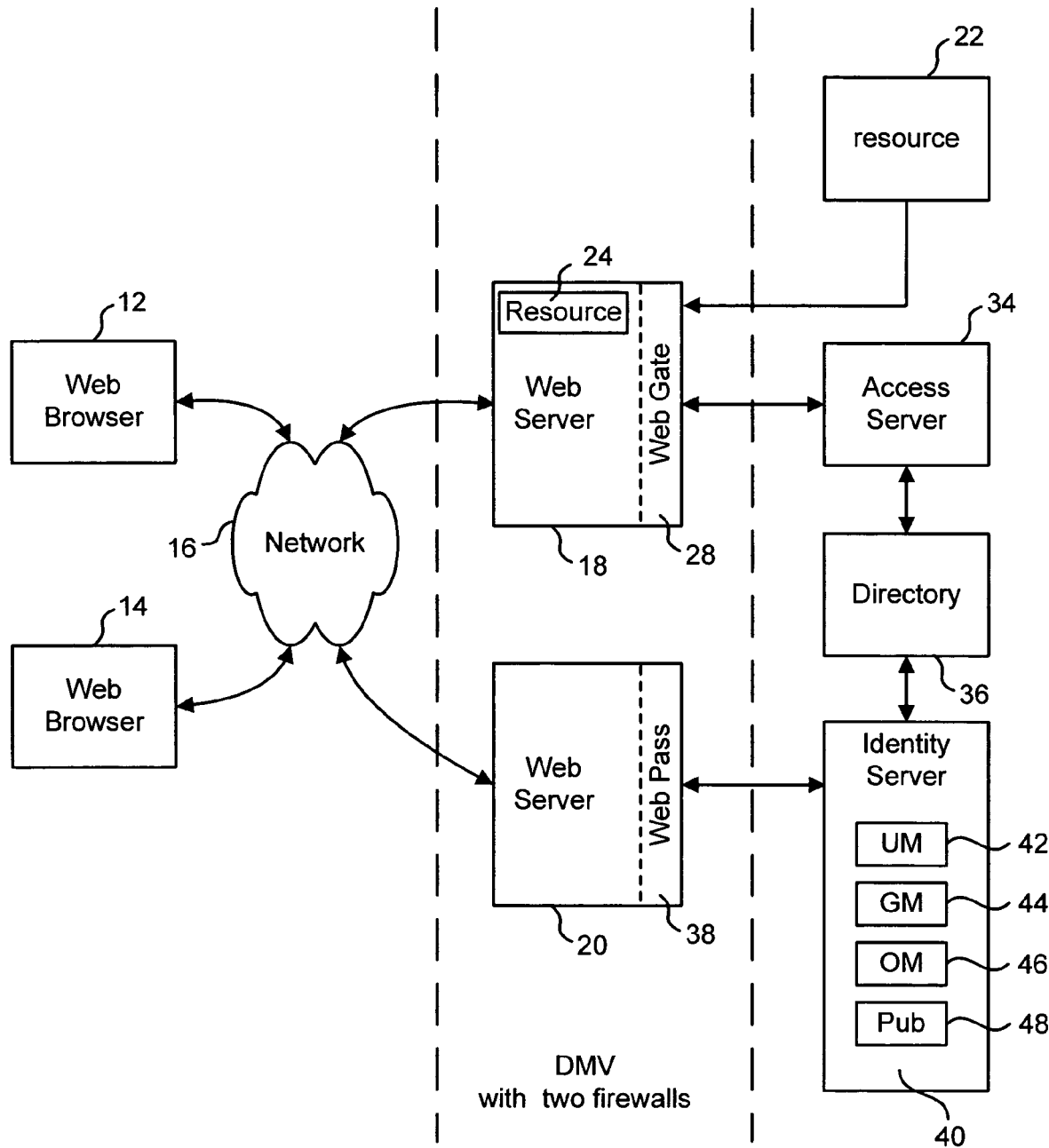
FIG. 1 is a block diagram depicting the components of one embodiment.

The present invention can be used with an Identity System, an Access System, or an integrated Identity and Access System ("an Access Management System"). The present invention can also be used with other systems. FIG. 1 depicts an example of an Access Management System that provides identity management services and/or access management services for a network. The identity management portion of the system manages identity profiles, while the access management portion of the system provides security for resources across one or more Web Servers (or other components). Although the system of FIG. 1 includes an integrated Identity System and Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet, however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 18 and 20 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see Internet Engineering Task Force Request for Comment (RFC) 1738). A resource can include a web page, software application, file, database, directory, data unit, etc. In one embodiment, a resource is the Identity System or a portion thereof such as an identity profile. In one embodiment, a resource is anything accessible to a user via a network. The network could be the Internet, a Local Area Network (LAN), a Wide Area Network (WAN), or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g., user, group, organization, thing, etc.). The data elements of the identity profile are called attributes. An attribute can be a characteristic, quality or element of information about something. In one embodiment, an attribute may include a name, a value and access criteria. Other embodiments may include more or less information.

The Identity Server includes three main applications, which effectively handle the identity profiles and privileges of the user population: User Manager 42, Group Manager 44, and Organization Manager (also called Object Manager) 46. User Manager 42 manages the identity profiles for individual users. Group Manager 44 manages identity profiles for groups. Organization Manager 46 manages identity profiles for organizations and/or can manage any object. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an Lightwieght Directory Access Protocol (LDAP) filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations and/or other objects within an e-business network, including partners, suppliers, or even major internal organizations such as sales offices and business units. Certain infrastructure security and management operations are best handled at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, handheld devices, mobile telephones, etc. Typically, such computing devices will have one or more processors that are programmed by code that is stored in one or more processor readable storage devices. The one or more processors are in communication with the processor readable storage devices, peripherals (e.g., keyboards, monitors, pointing devices, printers, etc.) and communication interfaces (e.g., network interfaces, modems, wireless transmitters/receivers, etc.).

A computing system that can be used for various components of embodiments as depicted in FIG. 1 can include a processor unit and main memory. A processor unit may contain a single microprocessor, or may contain a plurality of microprocessors for configuring the computer system as a multi-processor system. Main memory stores, in part, instructions and data for execution by the processor unit. If an implementation is wholly or partially implemented in software, main memory can store the executable code when in operation. Main memory may include banks of dynamic random access memory (DRAM) as well as high speed cache memory.

A computing system implementing an embodiment can further include a mass storage device, a peripheral device(s), a user input device(s), a portable storage medium drive(s), a graphics subsystem and an output display. The components may be connected through one or more buses or data transport means. For example, the processor unit and main memory may be connected via a local microprocessor bus, and the mass storage device, peripheral device(s), portable storage medium drive(s), and graphics subsystem may be connected via one or more input/output (I/O) buses. A mass storage device, which may be implemented with a magnetic disk drive or an optical disk drive, is a non-volatile storage device for storing data and instructions for use by the processor unit. In one embodiment, a mass storage device stores the system software for implementing embodiments for purposes of loading to main memory.

The portable storage medium drive operates in conjunction with a portable non-volatile storage medium, such as a floppy disk, to input and output data and code to and from the computer system. In one embodiment, the system software for implementing one embodiment is stored on such a portable medium, and is input to the computer system via the portable storage medium drive. A peripheral device(s) may include any type of computer support device, such as an input/output (I/O) interface, to add additional functionality to the computer system. For example, a peripheral device(s) may include a network interface for connecting the computer system to a network, a modem, a router, etc.

A user input device(s) provides a portion of a user interface. A user input device(s) may include an alpha-numeric keypad for inputting alpha-numeric and other information, or a pointing device, such as a mouse, a trackball, stylus, or cursor direction keys. In order to display textual and graphical information, the computer system of can include a graphics subsystem and output display. The output display may include a cathode ray tube (CRT) display, liquid crystal display (LCD) or other suitable display device. A graphics subsystem receives textual and graphical information, and processes the information for output to the display. Additionally, the system can include output devices such as speakers, printers, network interfaces, monitors, etc.

The components contained in a computer system in accordance with one embodiment are those typically found in computer systems and are intended to include a broad category of such computer components that are well known in the art. Thus, the computer system can be a personal computer, workstation, server, minicomputer, mainframe computer, or any other computing device. The computer can also include different bus configurations, networked platforms, multi-processor platforms, etc. Various operating systems can be used including Unix, Linux, Windows, Macintosh operating system (OS), Palm OS, and other suitable operating systems.

The system of FIG. 1 is scalable. There can be one or many Web Servers, one or many Access Servers, and one or many Identity Servers. In one embodiment, Directory 36 is a Directory Server and communicates with other servers/modules using LDAP or LDAP over Secure Sockets Layer (SSL). In other embodiments, Directory 36 can implement other protocols or can be other types of data repositories (e.g., relational database using Structured Query Language (SQL), etc.). Many variations of the system of FIG. 1 can be used with the present invention. For example, instead of accessing the system with a web browser, an Application Programmable Interface (API) can be used. Alternatively, portions of functionality of the system at FIG. 1 can be separated into independent programs that can be accessed with a URL.

To understand how the system of FIG. 1 protects a resource, first consider the operation regarding unprotected resources. First, an end user causes his or her browser to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
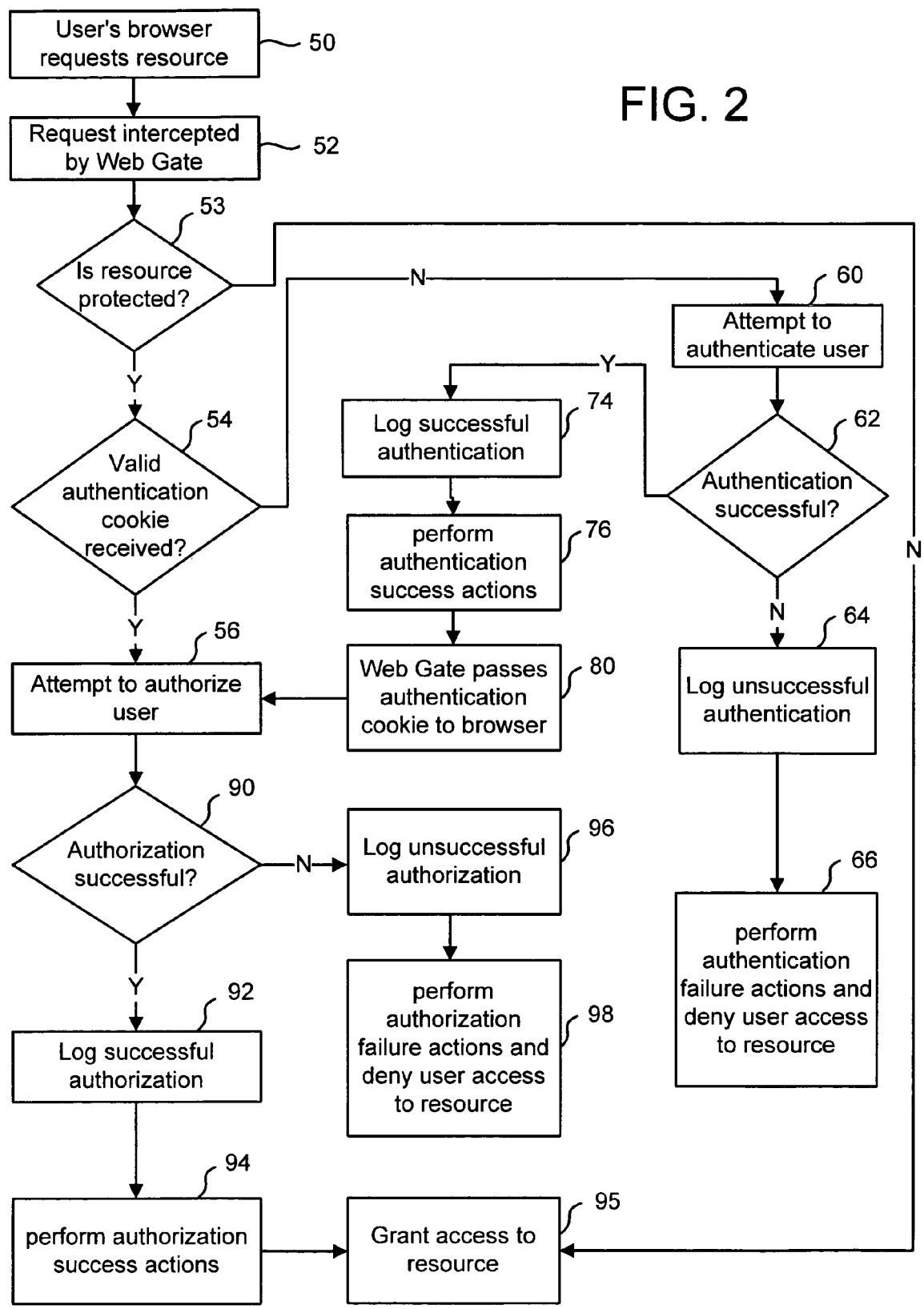
FIG. 2 is a flow chart describing one embodiment of a process for authenticating and authorizing.

FIG. 2 provides a flow chart for one embodiment of a method for authenticating and authorizing. In step 50, a user's browser 12 requests a web-enabled resource 22 or 24 (or another resource such as identity profile of the Identity System). The request is intercepted by Web Gate 28 in step 52. The method then determines whether the requested resource is protected by an authentication and/or authorization rule in step 53. If the resource is not protected, then access is granted to the requested resource in step 95. If the requested resource is protected, however, the method proceeds to step 54. If the user has previously authenticated for a protected resource in the same domain, a valid authentication cookie is passed by browser 12 with the request in step 50. The authentication cookie is intercepted by Web Gate in step 52. If a valid cookie is received (step 54), the method attempts to authorize the user in step 56. If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged in step 64. After step 64, the system then performs authentication failure actions and Web Gate 28 denies the user access to the requested resource in step 66. In step 74, the successful authentication of the user for the resource is logged. The method then performs authentication success actions in step 76. In response to the successful authentication, Web Gate 28 then passes a valid authentication cookie to browser 12 (step 80), which stores the cookie. After passing the cookie in step 80, the system attempts to authorize in step 56.

In step 56, the method determines whether the user is authorized to access the requested resource. If the user is authorized (step 90), the method proceeds to step 92. Otherwise, the unsuccessful authorization is logged in step 96. After step 96, the method performs authorization failure actions (step 98) and Web Gate 28 denies the user access to the requested resource. If authorization is successful (step 90), then the successful authorization of the user is logged in step 92. Authorization success actions are performed in step 94. The user is granted access to the requested resource in step 95. In one embodiment of step 95, some or all of HTTP request information is provided to the resource. In one or more scenarios, the resource being accessed is the Identity System. Other scenarios include accessing other resources.

More information about authorization, authentication, an Access System and an Identity System can be found in U.S. patent application Ser. No. 09/998,908, "Support for Multiple Data Stores," filed on Nov. 30, 2001, which is incorporated herein by reference in its entirety.

Figure 3:
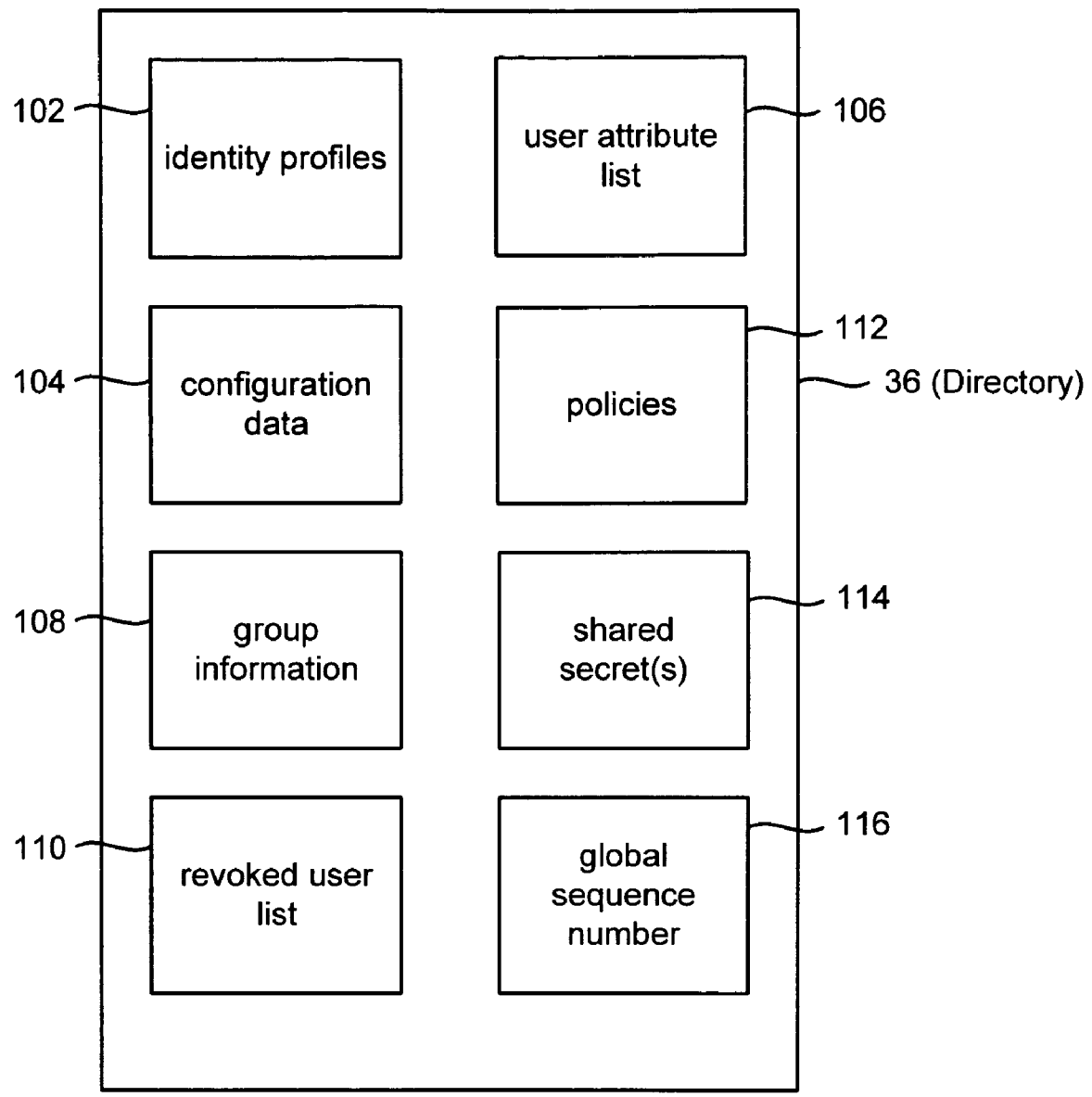
FIG. 3 is a block diagram depicting the components of a Directory Server.

Both the Identity System and the Access System make use of Directory 36. FIG. 3 is a block diagram depicting the components of Directory Server 36 in one embodiment. Directory Server 36 stores identity profiles 102 which include a set of attributes for end users or other entities. An entry or identity profile 102 of Identity System is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait, characteristic, quality or element of the object. In one embodiment, each attribute has a type, one or more values, and associated access criteria. The type describes the kind of information contained in the attribute, and the value contains the actual data.

An entry in the directory may have a set of attributes that are required and a set of attributes that are allowed. For example, an entry describing a person may be required to have a CN (common name) attribute and a SN (surname) attribute. One example of an allowed attribute may be a nickname. In one embodiment, any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, region, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

In one embodiment, each identity profile is based on a logical object class definition. Each logical object class may include single and multi-valued attributes. The attributes can be mandatory or optional. Each attribute can also have a data type and a semantic type. A semantic type is a behavior associated with an attribute. For example, the semantic type of a telephone number is to dial the telephone number.

Configuration data 104 is system and attribute configuration data. Configuration data can include attribute configuration information for the system such as: cardinality—identifying whether one or multiple values are associated with the attribute; display name—identifying a name to be displayed on a graphical user interface to describe the attribute; display type—identifying a display format for the attribute's display name; searchable—indicating whether a user can perform a search, based on the associated attribute; version—identifying the version of the Identity System software; visible—indicating whether the attribute can be viewed; and semantic type—identifying any action or special meaning associated with the attribute.

Group information 108 describes logical relationships and groupings of users having identity profiles 102 on Directory Server 36. A plurality of policies 112, each of which is associated with a policy domain are also stored on Directory Server 36. Revoked user list 110 identifies users previously (but no longer) allowed access to resources on the system. Shared secret(s) 114 are key stored on Directory Server 36 for encrypting cookies set on browsers 12 or 14 after a successful user authentication. Shared secret key(s) 114 can change as often as desired by an administrator. Global sequence number (GSN) 116 is a unique number stored on Directory Server 36 which is assigned to a policy domain change (first level default rules) or policy change (second level resource-specific rules) and updated in response to subsequent policy changes for cache flushing purposes. In one embodiment, the GSN is incremented to the next sequential number after detection of a policy domain or policy change. User attribute list is a list of user identity profile attributes used by cached authentication and authorization rules.

Figure 4:
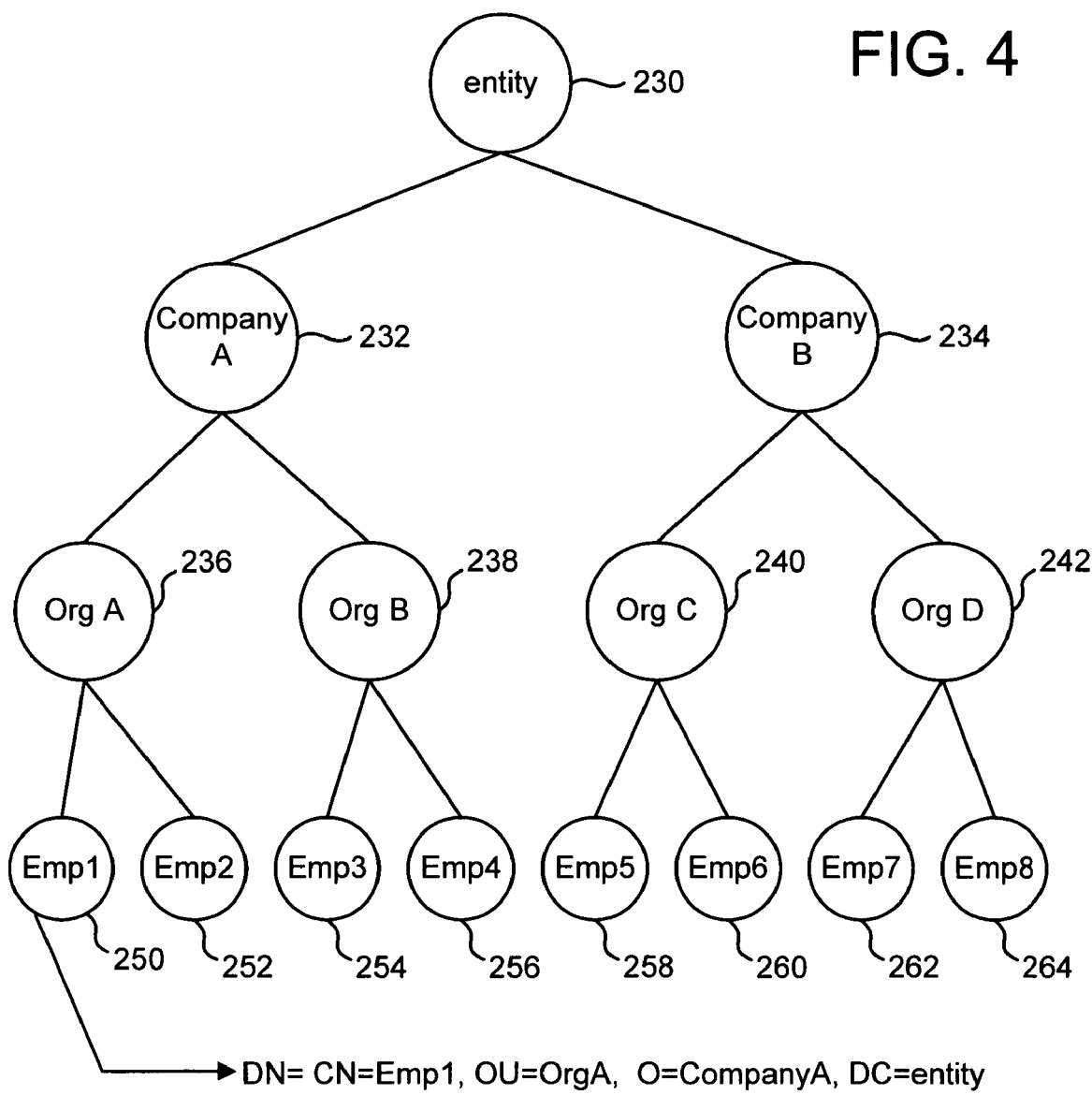
FIG. 4 is an example of a directory tree structure.
Figure 5:
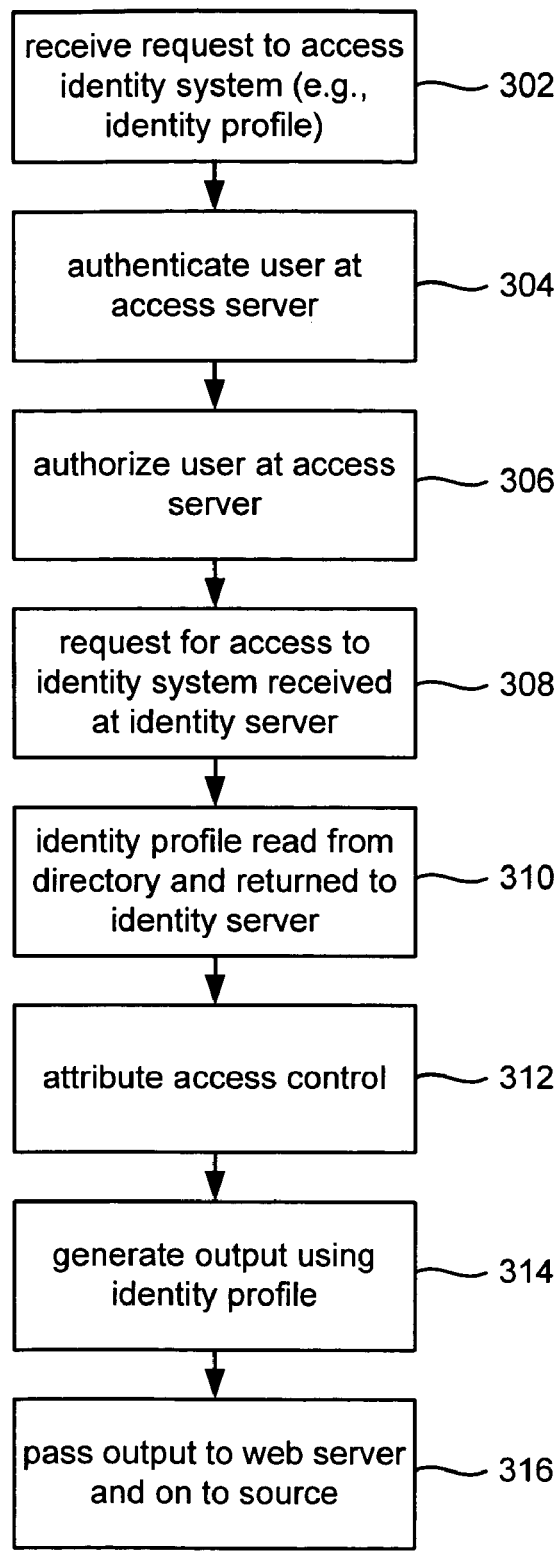
FIG. 5 is a flow chart describing one embodiment of a process for requesting and granting access to an Identity Management System.

FIG. 4 depicts an example directory tree that can be stored in Directory 36. Each node on the tree is an entry in the directory structure that includes an identity profile. In one embodiment, the entity can be a user, group, organization, or other type of definable object, including but not limited to, printers, telephones, etc. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 4 shows company A broken up into two organizations: organization A with node 236 and organization B with node 238. Company B is shown to be broken up into two organizations: organization C with node 240 and organization D with node 242. FIG. 5 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree. For example, the distinguished name of employee 1 (node 250) is DN=CN=Empl, OU=OrgA, O=CompanyA, DC=entity, where:
DC=Domain Component
O=Organization
OU=Organizational Unit
CN=common name.

FIG. 4 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

Each node depicted in FIG. 4 can include one or more identity profiles stored in Directory Server 36. In one embodiment, there are different types of object-oriented classes for storing information for each identity profile. One exemplary class pertains to entities such as entity 230, company A (node 232), and company B (node 234). A second exemplary class stores information about organizational units such as organization A (node 236), organization B (node 238), organization C (node 240), and organization D (node 242). In one embodiment, each of the organizations are departments in a company and each of the users are employees who work for that particular organization. A third exemplary class is for individual persons such as employee 1 (node 250), employee 2, (node 252), ... employee 8 (node 264). Although the directory tree is depicted as having three levels, more or less than three levels can be used.

In a typical use of the Identity Management System shown in FIG. 4, a source from the Identity Management System attempts to access a target in the Identity Management System. For example, employee 1 (node 250) may seek to access the profile for employee 4 (node 256). Thus, node 250 is the source and node 256 is the target. For efficiency purposes, one embodiment stores access information at the target and at the highest level for targets with common access rules. In some cases, access information is stored at a higher level even if a lower level does not include common access rules.

There are many ways for an entity to access and use the Identity System. In one embodiment, the entity can access the Identity System's services using a browser. In other embodiments, eXtensible Markup Language (XML) documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

FIG. 5 depicts a high level flow chart describing a method for processing a request to access an Identity System. Various steps of FIG. 5 overlap those of FIG. 2 which illustrates an overview of authentication, authorization, and granting of access to a resource protected by an Access System. FIG. 5, however, presents a method for processing a request for the Identity System itself (e.g., an identity profile). A request to access the Identity System is received at web server 20 from browser 12 at step 302. Various requests can be made to access the Identity System. For example, a user may point his browser to Web Server 20 and request to view and/or modify an identity profile stored in directory 36. The user requesting access to the Identity System is authenticated at step 304. In one embodiment, authentication at step 304 is performed as described with respect to step 60 of FIG. 2. Browser 12 can be re-directed to web server 18 for authentication of the user at Access Server 34. Web gate 28, in conjunction with an authentication module at Access Server 34, can authenticate the user according to an authentication challenge scheme which can implement various authentication methods such as basic, form, and certificate. For example, if form-based authentication is being used, Web gate 28 can re-direct browser 12 to an authentication form URL. The authentication form can be constructed at Access Server 34 from configuration data stored in directory 36 and other information such as template HyperText Markup Language (HTML) files and message catalogs maintained at the server. Web gate 28 can allow the authentication form to pass from Access Server 34 to browser 12. After the user has filled-out the authentication form, the information can be received at Web gate 28 and passed to Access Server 34. Access Server 34 can authenticate the user using a user ID and password received from Web gate 28. After authenticating the user, Access Server 34 returns an authentication result, authentication actions, and user attributes to Web gate 28.

The user is authorized for access to the Identity Management System at step 306. In one embodiment, authorization is performed as described with respect to step 56 of FIG. 2. Web gate 28 and an authorization module at Access Server 34 can apply one or more authorization rules to determine whether the user is authorized to access the requested resource(s) of the Identity System. Once the user is authenticated and authorized, the request for resources of the Identity System can be passed to Identity Server 40 at step 308. If the request is to access an identity profile maintained in the directory 36, for example, Identity Server 40 can read the identity profile from directory 36 at step 310 and perform attribute access control at step 312. Step 312 can include determining which attributes of the requested profile the user is authorized to view. If the user requests to modify one or more attributes, step 312 can include determining which attributes within the requested profile the user is authorized to modify.

After performing attribute access control, Identity Server 40 can generate an output using data from the identity profile and various files maintained at the server (e.g., static HTML files). For example, Identity Server 40 can construct HTML and/or XML page(s) having data from the requested identity profile. The page(s) can be constructed from form-based documents and resources maintained at the Identity Server. The output generated at step 314 can be a simple display of the attribute values from the identity profile which the user is authorized to view. If the user requests modification of one or more attributes, the output can include a user interface adapted to receive modification information from the user. After generating the necessary output, the identity server will pass the output to web server 20 which passes the requested resource(s) to browser 12.

With today's requirements to support globally diverse environments, it is becoming increasingly necessary to provide Identity and Access Systems having information stored and displayable in various languages. Prior art techniques suffer from the attendant shortcomings of installing multiple identity servers, access servers, and/or directories to provide configuration and identity profile data in various languages. Furthermore, these systems have scalability issues because they require the addition of servers and code when new language support is added. Accordingly, embodiments provide for Identity and Access Systems that can store and display configuration data and identity profile data in multiple languages. Moreover, embodiments can ascertain a preferred language associated with requests for Identity and Access Systems in order to provide requesting users with data in the language identified by the user's preference. Embodiments can provide such functionality while utilizing a single Identity and/or Access System. A single system, as provided in embodiments, can allow scalability and manageable maintenance of the system by administrators and other support personnel. The system has the ability to be easily scaled and modified in order to provide additional language capabilities as the needs for such capability arise.

In accordance with one embodiment, a plurality of values, each corresponding to a distinct language, country and/or culture are provided for one or more attributes, as part of configuration data 104. FIG. 6 depicts an exemplary portion 104$_1$ of an implementation of configuration data 104 in accordance with one embodiment. Configuration data 104$_1$ depicted in FIG. 6 includes a small number of attributes for exemplary purposes. In various implementations, the number of attributes can vary. Configuration data 104$_1$ may include numerous attributes in addition to those depicted in FIG. 6.

Configuration data 104$_1$ includes configuration data for three exemplary attributes: CN (commonly referred to as common name); TITLE; and SALARY. Other embodiments may include more or less than three attributes. In order to provide multi-language support capabilities, attribute configuration data 104$_1$ includes a plurality of values for each attribute that provide values for that attribute that correspond to a particular language. Looking at attribute CN for example, a plurality of values for the display name of attribute CN are provided. Each of the values are indexed according to a language and country (also referred to as culture) code by including a language component and a value component. The language component can include a language and/or country designation. In one embodiment, language codes are formatted according to the ISO-639 definitions and country codes are formatted according to the ISO-3166 definitions.

Attribute CN includes a first value having an en-US language component and a "name" value component. Together, the language component and the value component comprise a single value for attribute CN. In this example, the language component en-US designates English as used in the United States. Accordingly, the display name for configuring attribute CN is the English word "name." A second value for attribute CN is also provided that includes a language component fr-FR and a value component "nom." This second value includes a language component designating French as used in France and a value component corresponding to the French word for name, or "nom." A third value is provided that includes a language component de-DE designating German as spoken in Germany and a corresponding value component "namn." Together, the three values, each comprised of a language component and a value component, make up the display name configuration data for attribute CN. Similar entries are also provided for other attributes within configuration data 104$_1$.

The attribute TITLE includes a first display name value that includes a language component en-US and a value component "title." A second value includes a language component fr-FR and a value component "titre." A third value for the attribute TITLE includes a language component de-DE and a value component "berufsbezeichnung." The SALARY attribute depicted in attribute configuration data 104 also includes three display name values. The first value includes a language component en-US and a value component "salary." The second value includes a language component fr-FR and a value component "paie." The final value for the SALARY attribute includes a language component de-DE and a value component "gehalt."

When multi-valued attributes indexed according to language are provided for multi-language support and capabilities, various languages or language packs can be installed at the Access Server and/or Identity Server. The language pack can include an indication of installed or supported languages. The installed languages correspond to known languages provided for various attributes in Directory 36. Static data such as static XML, HTML, or SQL documents can be maintained for each installed language at the server(s). This data can include form or template pages and files for generating outputs. In one embodiment, a directory or file structure is provided at the server(s) with language specific static data and files maintained by language in the directory structure.

When an output such as an HTML or XML document is to be generated by Identity Server 40 or Access Server 34, such output can be presented in a language corresponding to a preference of a requesting user. When a user requests to view an identity profile for example, Identity Server 40 can construct an output user interface for displaying the data of the requested profile. The user interface can include the values in the identity profile for each of the attributes. In addition, the user interface can include attribute configuration data such as the display name for each attribute. The user interface may include the attribute display name (e.g., "name" for attribute CN) before the actual identity profile value (e.g., "John Smith") for that attribute. The identity server can determine the preferred language of the requesting user and construct the output to include the display name value(s) that correspond to the preferred language of the requested user. If the user has a preferred language of French as spoken in France, Identity Server 40 can present configuration data to the user in French. If the user requests to view an identity profile and the configuration display name values for attributes CN, title, and salary are to be displayed, Identity Server 40 can construct the output to include the display names "nom" for the CN attribute, "titre" for the TITLE attribute, and "paie" for the SALARY attribute.

The concept of providing multi-valued attributes for configuration data can be extended to identity profiles to provide language-specific identity profile data. In this manner, a user's identity profile can be displayable according to differing language requirements. FIG. 7 depicts an exemplary configuration of an identity profile 102$_1$ of identity profiles 102. As with configuration data 104$_1$, identity profile 102$_1$ includes a small number of attributes for exemplary purposes. Various embodiments may include more or fewer attributes than that of identity profile 102$_1$. Identity profile 102$_1$ includes three attributes: CN; TITLE; and SALARY. As with configuration data 104$_1$, the values for each of the attributes within identity profile $102_1$ are multi-valued to provide language-specific values for each attribute.

The first attribute, CN, includes three values. The first value includes a language component en-US and a value component "John Smith." The second value includes a language component fr-FR and a value component "Jean Smith." The final value for the CN attribute includes a language component de-DE and a value component "Hans Smith." Accordingly, the common name attribute for this user's identity profile includes three language specific versions (English, French, and German) of his common name. The TITLE attribute for this identity profile is also provided with three values. The first value includes a language component en-US and a value component "bank manager." The second value includes a language component fr-FR and a value component "gerant de banque." The third value includes a language component de-DE and a value component "bank direktor." Accordingly, the TITLE attribute for this identity profile includes three values designating three language-specific values for the TITLE attribute.

A final attribute, SALARY, is also provided in identity profile $102_1$. The salary attribute is not multi-valued. Accordingly, it is simply listed with a single value of 100,000. Each attribute in an individual identity profile or configuration data need not include multi-valued configurations. Moreover, individual attributes within an identity profile or configuration data need not include the same number of values. For example, the CN attribute could include only an English and French version, while the TITLE attribute could include an English, French, and German (or other) versions.

Although not shown in the example of configuration data $104_1$ or identity profile $102_1$, multiple values corresponding to the same language can be provided for an attribute's values. One or more additional attribute values having the same language component can be established. The value component(s) for the additional attribute(s) can specify the additional value to be associated with the language component. For example (referring to profile $102_1$), suppose that John Smith is also a Chief Executive Office (CEO) such that two values need to be specified for the TITLE attribute. To specify the additional title in English, an additional attribute value having an "en-US" language component and a "CEO" value component can be provided and listed in the profile just as the other attribute values. Additional attribute values can also be made to specify the "CEO" title in the other languages as well.

FIGS. 8A and 8B depict exemplary outputs for a requested identity profile that can be constructed from multi-valued attributes in accordance with one embodiment. The outputs depicted in FIGS. 8A and 8B include attribute configuration display data from configuration data 104 and identity profile data from identity profiles 102. In one embodiment, the outputs depicted in FIGS. 8A and 8B include at least one of an HTML document, an XML document, or other suitable file. FIG. 8A depicts an output that can be constructed when a requesting user's preferred language is English. "name," "title," and "salary" are the English versions of the display names for the CN attribute, TITLE attribute, and SALARY attribute. The display name values are obtained from the value components corresponding to the en-US language components for the various attributes in configuration data $104_1$. When the output is constructed, configuration data $104_1$ is accessed in order to obtain the appropriate display name value (for each attribute) corresponding to the preferred language. The preferred language is also used to construct the output with language-specific profile data. Since the requesting user's preferred language is English, the English values for each attribute in the requested identity profile $102_1$ are obtained and used in the construction of the output. "John Smith" and "bank manager" are the English versions of the values in identity profile $102_1$ for the CN attribute and TITLE attribute. These values are obtained from the value components corresponding to the en-US language components for the various attributes in identity profile $102_1$. Accordingly, these values, in addition to the only maintained value (100,000) for the SALARY attribute, are placed into the constructed output.

FIG. 8B depicts an alternate output when the requesting user's preferred language is French. Accordingly, in the output of FIG. 8B, configuration data $104_1$ is accessed to retrieve French value components for the attribute configuration display names. The CN attribute value component ("nom") corresponding to the fr-FR language component is retrieved and included in the output. The title attribute value component ("titre") corresponding to the fr-FR language component is retrieved and included in the output. The SALARY attribute value component ("paie") corresponding to the fr-FR language component is retrieved and included in the output.

Additionally, the value components of identity profile $102_1$ corresponding to the fr-FR language components are used to construct the identity profile values included in the output. The value component "Jean Smith" is included in the output for the CN attribute, the "gerant de banque" value component for the TITLE attribute is included in the output, and the single value of 100,000 is included for the SALARY attribute value component.

If two or more values (each comprised of a language component and value component) for an attribute include the same language component, one or more of the corresponding value components can be returned and included in a response when that language component is the preferred language associated with a request. For example, assume again that the TITLE attribute in identity profile $102_1$ includes a first value of "en-US; bank manager" and a second value of "en-US; CEO." If the preferred language of a request is en-US, "bank manager," "CEO," or "bank manager" and "CEO" could be returned in a response. If the request specifies only a single value, then the first listed entry can be returned (e.g., "bank manager"). If the request specifies two values, specifies all values, or makes no designation, all of the values corresponding to the preferred language can be returned.

As depicted in FIGS. 8A and 8B, a server such as Identity Server 40 can construct a language-specific output according to a requesting user's preferred language. Because multi-valued attributes are stored within directory 36 for configuration data and identity profiles, a single server configuration can be used to present language-specific data to requesting users. This can provide for both scalability and performance improvements over prior art techniques.

FIG. 9 is a flow chart in accordance with one embodiment describing a method for providing language-specific attribute data corresponding to a requesting user's preferred language. The method of FIG. 9 can be used in various embodiments to provide language-specific data for an Identity System, for an Access Management System, for an integrated Identity/Access Management System or for other types of systems. A request is received at a server at step 402. The request received at step 402 can include a request to view or modify an identity profile, a request to authenticate a user, a request to authorize a user, or other types of requests associated with an identity profile or attribute configuration data. If the request received at step 402 is an authentication request, FIG. 9 can be performed as part of the authentication at step 60 of FIG. 2 for authenticating a user. If the request received at step 402 is an authorization request, FIG. 9 can be performed as part of step 56 of FIG. 2 for authorizing a user. If the request is a request to access an identity profile, FIG. 9 can be performed as part of step 95 of FIG. 2 for granting access to the resource. In another example, the request is an authorization or authentication request received at Access Server 34.

After receiving the request, a determination is made as to whether a preferred language of the requesting user matches an installed language at the server at step 404. A requesting user's preferred language can be determined using numerous techniques as hereinafter described. A URL, HTTP header variable, cookie, or identity profile associated with the request, can specify a preferred language. In one embodiment, a hierarchy can be established for determining which of a number of preferred languages associated with a request is to take precedent for a particular request.

If it is determined that no specified languages associated with the request match a language installed at the server, the method proceeds to step 406 where an approximate match is performed. Step 406 can include various techniques for performing an approximate match. In one embodiment, a language component of an attribute value includes a language code as well as a country or culture code. A request may be associated with a preferred language of English and a preferred country of the United Kingdom (en-UK), for example. The server may determine at step 404 that UK English is not installed. The approximate match performed at step 406 can include determining whether any English languages are installed. Accordingly, step 406 can include determining whether there is a match based only on the language code as opposed to the combination of a language and country code. In one embodiment, if an approximate match cannot be made at step 406, a default language is used.

After performing an approximate match or determining that a preferred language matches an installed language, the method proceeds to step 408 where the server determines whether the values for a first attribute associated with the request are cached at the server. As described below, the server may have previously accessed the attribute and cached the multiple values for the attribute at the server. If it is determined at step 408 that the values for the attribute are not cached at the server, the method proceeds to step 410 where the server retrieves the multiple values for the requested attribute. For example, a request to access a user identity profile can be handled by Identity Server 40 which will access directory 36 to retrieve the values for the attribute. Referring to FIG. 7 for example, Identity Server 40 may access identity profile 102₁ to retrieve each of the values for the CN attribute associated with the identity profile. In the example of FIG. 7, Identity Server 40 would retrieve the values "en-US; John Smith," "fr-FR; Jean Smith," and "de-De; Hans Smith" for the CN attribute.

After retrieving each of the attribute values, the retrieved values are parsed at step 412. Step 412 can include reading each value for the attribute, which will include both a language component and value component, to ascertain the various languages and related values. After parsing the attribute values, an attribute table is built and indexed according to the configured language components at step 414. The table built and indexed at step 414 can include the language component and the value component for each of the attribute values retrieved at step 410. The table can be indexed according to language to provide for increased performance when accessing the table at a subsequent point in time.

FIG. 10 is an exemplary attribute table that can be built and indexed at step 414 of FIG. 9. Assume the request received at the server at step 402 is a request to access an identity profile.

Configuration data 104₁ can be accessed to determine the multiple configuration display name values for the CN attribute. Using the configuration data, an output will be constructed that includes the display name for each attribute in the identity profile. After reading each value from configuration data 104₁, the identity server can construct table 506. Table 506 includes three columns. The first column designates the language component (language and country code) of the attribute value read at step 410 of FIG. 9. The second column includes an index number corresponding to each language and country code combination. An index number can be provided and used at the server in order to quickly access the preferred language value. For example, rather than searching through multiple values stored at the identity server after having read the values from the directory to find a language and country code matching the preferred language, reference can simply be made to the index with the knowledge of which index number corresponds to the preferred language. The third column includes the attribute value or values (e.g., display name) corresponding to the language component of the first column. For the CN attribute, table 506 includes a "name" value component corresponding to the en-US language component, a "nom" value component corresponding to the fr-FR language component, and a "namn" value component corresponding to the de-DE language component. If the CN attribute includes multiple values with the same language component, table 506 can be constructed to include an entry for each of the values. For example, table 506 may include an additional row that includes the en-US language component in the first column, index 0 in the second column, and an additional value component for the CN attribute in English in the third column.

After building the attribute table, or after determining that the attribute values have previously been cached, the flow chart proceeds to step 416 where the server reads the attribute value(s) from the table that correspond to the preferred language (or a default language) determined at step 404 or step 406.

After reading the attribute value(s) for the preferred language, the server will construct an output using the preferred language attribute value(s) at step 418. Step 418 can include numerous outputs in accordance with various implementations and embodiments. For example, if the request received at step 402 is to access an identity profile, the output constructed at step 418 can be a user interface including a representation of the identity profile requested at step 402, such as depicted in FIGS. 8A and 8B. An identity server can construct such an output using the attribute value read at step 416, as well as static data that may be stored at a Identity Server 40. For example, Identity Server 40 may access a standard HTML document, XML document, and/or SQL data installed for a particular language to construct a specialized HTML or XML output at step 418. This output will include the attribute value(s) read at step 416. Step 418 can include constructing the output to include attribute configuration data for the requested attribute in addition to identity profile data. For example, the output including the requested identity profile will include the identity profile attribute values as well as the display name attribute value (determined from configuration data) for each attribute. In another example, the output constructed at step 418 can be an authentication form sent to a requesting user's browser to authenticate the user. The authentication form can be constructed by access server 34 and passed to the user's browser. The authentication form can include values for various attributes as maintained in configuration data 104. For example, the authentication form may include a log-in portion and a password portion. The log-in attribute display name value can be constructed according to the user's preferred language and a corresponding value maintained in configuration data 104. Numerous other examples of the output constructed at 418 will be apparent to those of ordinary skill in the art.

If an attribute includes multiple values with the preferred language as a language component, step 418 can include constructing the output to include one or more of the multiple value components as previously described. For example, if the request is only for a single value, then the first listed value with the preferred language component could be included. If the request is for multiple values or makes no designation, each value having the preferred language as a language component could be included.

It will be appreciated by those of ordinary skill in the art that steps 408 through 418 can be performed in parallel or sequence for each of the attributes necessary to fulfill a request. For example, if a user requests an identity profile that includes three attributes, then a determination will be made as to whether the values for each of those three attributes are cached and then each of the three attributes' plurality of values will be retrieved, parsed and used to construct a table, if not cached. In one embodiment, the table constructed at step 414 is a combined table for each of the requested attributes, while in other embodiments, a single table is used for each individual attribute.

Figure 11:
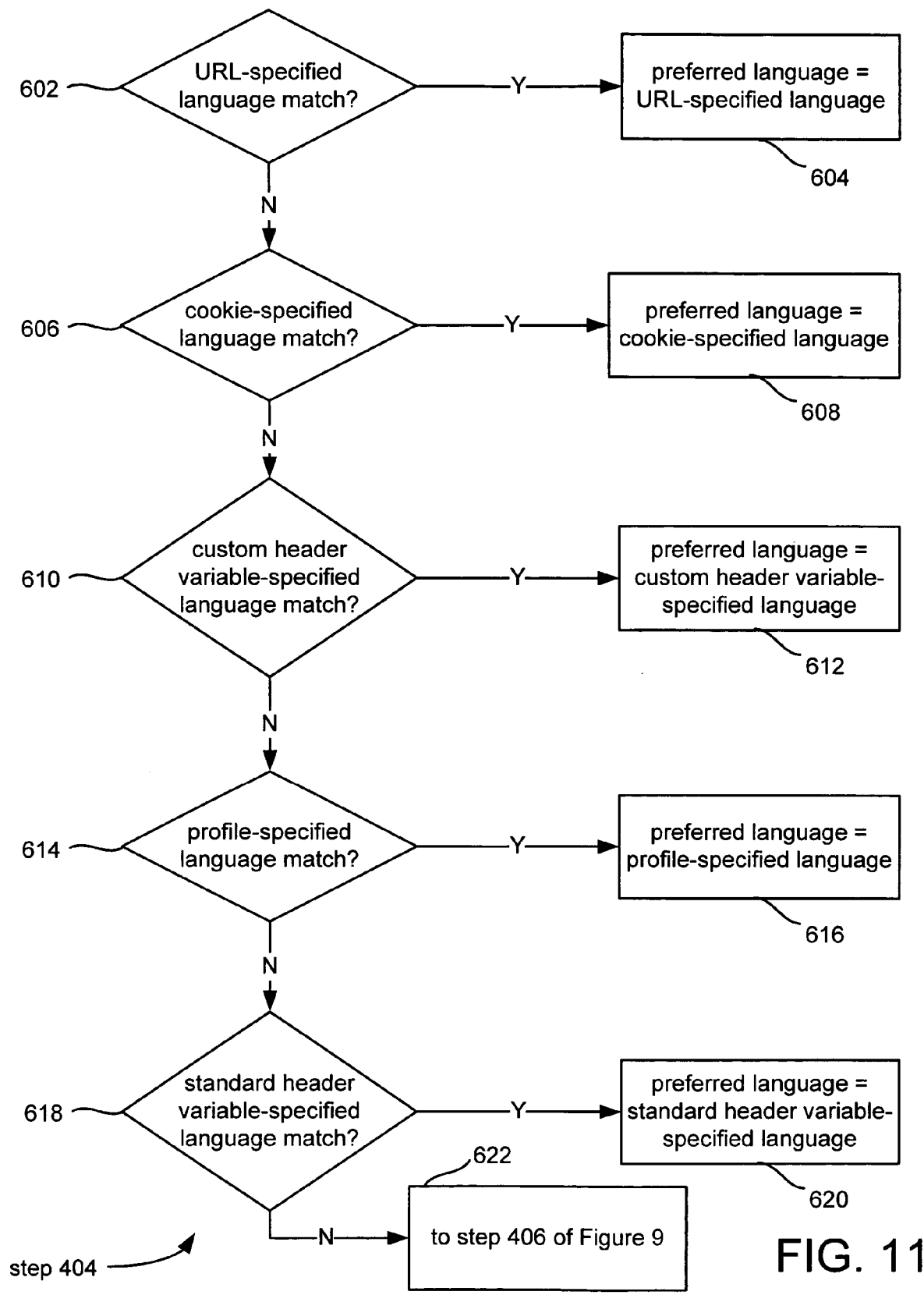
FIG. 11 is a flow chart describing one embodiment for determining a preferred language associate with a request.

Numerous techniques can be used to designate preferred languages associated with requests. Such techniques can include URL-specified languages, cookie-specified languages, custom HTTP header variable-specified languages, identity profile-specified languages, and standard HTTP header variable-specified languages. In accordance with other embodiments, other techniques for specifying preferred languages can be used. Likewise, a server can utilize various techniques for determining a preferred language of a requesting user. FIG. 11 depicts an exemplary flow chart describing a method for selecting a preferred language associated with a request. The method of FIG. 11 can be used at step 404 of FIG. 9. FIG. 11 assumes a particular hierarchy as to which of a number of specified languages is to be treated as the preferred language. In other embodiments, other hierarchies can be established.

At step 602, the server determines whether a language specified in a URL received from a user's browser matches a language installed at the server. The specified language may be included within query data or a query string of the URL. If the server determines that the specified language of the URL matches an installed language, the server designates the URL-specified language as the preferred language at step 604. If the URL-specified language does not match an installed language, then the flow chart proceeds to step 606 where the server determines whether a cookie-specified language matches an installed language. A cookie transmitted with a requested URL may include a designation of a preferred language. If the cookie-specified language matches an installed language, the server sets the preferred language to the cookie-specified language at step 608. If, however, the cookie-specified language does not match an installed language, the flow chart proceeds to step 610 where the server determines whether a custom HTTP header variable-specified language matches an installed language. A custom HTTP header variable can be used in various implementations. For example, after authenticating and authorizing a user, Access Server 34 can place a custom HTTP header variable into a user's HTTP request when the request is re-directed to Identity Server 40. If the custom HTTP header variable-specified language matches an installed language, then the server sets the preferred language to the custom header variable-specified language at step 612. If the custom header variable-specified language does not match an installed language, the method proceeds to step 614 where the server determines whether an identity profile-specified language associated with the request matches an installed language. An identity profile, such as identity profile $102_1$, can include an attribute for a preferred language (not shown). The server can check the identity profile to determine whether the attribute value of the preferred language matches an installed language. If it does, the server sets the preferred language to the profile-specified language at step 616. If the profile-specified language does not match an installed language, operation of the method proceeds to step 618 where the server determines whether a standard HTTP header variable-specified language matches an installed language. As known to those of ordinary skill in the art, HTTP requests include a standard header variable that specifies a language. For example, when a user installs and sets up a browser, a preference for a language may be selected. This language preference is then included in a standard HTTP header variable passed with each HTTP request. The server can check that standard HTTP header variable at step 618. If the HTTP header variable matches an installed language then the server sets the preferred language to the standard HTTP header variable-specified language at step 620. If the standard HTTP header variable-specified language does not match the installed language, operation of the method proceeds to step 406 of FIG. 8 where an approximate match is performed as previously described.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of managing attributes, comprising:

maintaining, at a data store, an access management system configured to receive a request to view and modify at least one of a plurality of identity profiles, wherein the request is associated with a preferred language;

determining, at the access management system, whether the preferred language of a requesting user matches an installed language at the access management system;

in response to the preferred language not matching the installed language, performing an approximate language match based at least in part on a language code associated with the preferred language;

maintaining the plurality of identity profiles at the data store, wherein each individual identity profile comprises a single data structure that includes one or more multi-valued attributes, said one or more multi-valued attributes includes a plurality of language components and value components, each of said value components specifies a value for said one or more attributes that is associated with a corresponding language component, said individual identity profile contains all available language components and value components for said one or more multi-valued attributes;

receiving a request associated with said one or more multi-valued attributes at a server, said request is associated with the preferred language;
retrieving from the single data structure said one or more multi-valued attributes; and
generating an output in response to said request, said output includes at least one first value for said one or more attributes that corresponds to said preferred language.

2. The method of claim 1, wherein:
said request is a request to view or modify said identity profile; and
said output includes at least one of an HyperText Markup Language (HTML) document and an eXtensible Markup Language (XML) document including at least a portion of said identity profile.

3. The method of claim 1, wherein:
said one or more multi-valued attributes are included in configuration data maintained at said data store; and
said at least one first value for said one or more multi-valued attributes that corresponds to said preferred language is at least one language specific display name for said one or more multi-valued attributes.

4. The method of claim 3, wherein:
said request is a request to view or modify said configuration data; and
said output includes at least one an HyperText Markup Language (HTML) document an eXtensible Markup Language (XML) document including at least a portion of said configuration-data.

5. The method of claim 3, wherein:
said request is an authentication request; and
said output is an authentication form including at least a portion of said configuration information.

6. The method of claim 1, wherein:
said request is an authorization request.

7. The method of claim 1, wherein:
said plurality of language components each include at least one of a language code and a country code.

8. The method of claim 1, further comprising:
reading said plurality of language components and value components for said one or more multi-valued attributes; and
generating a table at said server, said table corresponds to said one or more multi-valued attributes, includes said plurality of language components and value components, and is indexed according to said plurality of language components.

9. The method of claim 1, further comprising:
determining said preferred language associated with said request.

10. The method of claim 9, wherein:
determining said preferred language includes determining said preferred language from at least one of a Uniform Resource Locator (URL) associated with said request, a hypertext transfer protocol (HTTP) header variable associated with said request, an identity profile associated with said request, and a cookie associated with said request.

11. The method of claim 1, wherein:
said server is part of an Identity System.

12. The method of claim 1, wherein:
said server is part of an Access System.

13. The method of claim 1, wherein:
said server is part of an integrated Identity/Access System.

14. A method of managing attributes, comprising:
maintaining, at a data store, an access management system configured to receive a request to view and modify at least one of a plurality of identity profiles, wherein the request is associated with one or more multi-valued attributes, said request is associated with a preferred language;
determining said preferred language from at least one of a Uniform Resource Locator (URL) associated with said request, an HTTP a hypertext transfer protocol (HTTP) header variable associated with said request, an individual identity profile associated with said request, and a cookie associated with said request, wherein each individual identity profile comprises a single data structure, wherein said individual identity profile contains all available language components and value components for said multi-valued attribute;
determining, at the access management system, whether the preferred language of the request matches an installed language at the access management system;
in response to the preferred language not matching the installed language, performing an approximate language match based at least in part on a language code associated with the preferred language;
retrieving from the single data structure said one or more multi-valued attributes, said one or more multi-valued attributes includes a plurality of values, each of said values includes a language component and a value component, each value component specifies a value for said one or more multi-valued attributes that is associated with a corresponding language component; and
generating a response to said request, said response includes at least one first value for said one or more multi-valued attributes that corresponds to said preferred language.

15. The method of claim 14, wherein:
said one or more multi-valued attributes are included in an identity profile maintained at a data store;
said request is a request to view or modify said identity profile; and
said response includes said at least one first value for said one or more multi-valued attributes in a representation of at least a portion of said identity profile.

16. The method of claim 14, wherein:
said one or more multi-valued attributes are included in configuration information maintained at said data store; and
said at least one first value for said one or more multi-valued attributes that corresponds to said preferred language is at least one language specific display name for said one or more multi-valued attributes.

17. The method of claim 14, wherein:
said plurality of language components each include at least one of a language code and a country code.

18. The method of claim 14, wherein:
said server is part of an Identity System.

19. The method of claim 14, wherein:
said server is part of an integrated Identity/Access System.

20. One or more processor readable storage devices having processor readable code embodied on said one or more processor readable storage devices, said processor readable code for programming one or more processors, said processor readable code comprising:
code for maintaining, at a data store, an access management system configured to receive a request to view and modify at least one of a plurality of identity profiles, wherein the request is associated with one or more multi-valued attributes, said request is associated with a preferred language;

code for determining said preferred language from at least one of a Uniform Resource Locator (URL) associated with said request, an HTTP a hypertext transfer protocol (HTTP) header variable associated with said request, an individual identity profile associated with said request, and a cookie associated with said request, wherein each individual identity profile comprises a single data structure, wherein said individual identity profile contains all available language components and value components for said multi-valued attribute;

code for determining, at the access management system, whether the preferred language of the request matches an installed language at the access management system;

in response to the preferred language not matching the installed language, code for performing an approximate language match based at least in part on a language code associated with the preferred language;

code for retrieving from the single data structure said one or more multi-valued attributes, said one or more multi-valued attributes include a plurality of values, each of said values includes a language component and a value component, each value component specifies a value for said one or more multi-valued attributes that is associated with a corresponding language component; and code for generating a response to said request, said response includes at least one first value for said one or more multi-valued attributes that corresponds to said preferred language.

21. One or more processor readable storage devices according to claim 20, wherein:
said one or more multi-valued attributes are included in an identity profile maintained at a data store;
said request is a request to view or modify said identity profile; and
said response includes said first value for said one or more multi-valued attributes-in a representation of at least a portion of said identity profile.

22. One or more processor readable storage devices according to claim 20, wherein:
said one or more multi-valued attributes are included in configuration information maintained at a data store; and
said at least one first value for said one or more multi-valued attributes that corresponds to said preferred language is at least one language specific display name for said one or more multi-valued attributes.

23. One or more processor readable storage devices according to claim 20, wherein:
said plurality of language components each include at least one of a language code and a country code.

24. One or more processor readable storage devices according to claim 20, wherein:
said server is part of an integrated Identity/Access System.

25. A method of managing attributes, comprising:
maintaining, at a data store, an access management system configured to receive a request to view and modify at least one of a plurality of identity profiles, wherein the request is associated with one or more multi-valued attributes, said request is associated with a preferred language;
determining, at the access management system, whether the preferred language of the request matches an installed language at the access management system;
in response to the preferred language not matching the installed language, performing an approximate language match based at least in part on a language code associated with the preferred language;

providing a plurality of multi-valued attributes in a single entry at the data store, wherein said single entry contains all available values for said multi-valued attributes, said plurality of multi-valued attributes comprising a first multi-valued attribute that includes a plurality of values, said plurality of values are indexed using a language component provided as part of each of said plurality of values, each of said plurality of values includes a value for said attribute corresponding to an associated language component;

retrieving from the single entry at the data store said plurality of multi-valued attributes; and generating a response to a request associated with said first one multi-valued attribute, said request is associated with the preferred language, said response includes at least one first value for said first multi-valued attribute that corresponds to said preferred language.

26. The method of claim 25, wherein:
said single entry is an identity profile maintained at said data store;
said request is a request to view or modify said identity profile; and
said response includes said at least one first value for said first multi-valued attribute in a representation of at least a portion of said identity profile.

27. The method of claim 25, wherein:
said first multi-valued attribute is included in configuration information maintained at said data store; and
said at least one first value for said first multi-valued attribute that corresponds to said preferred language is at least one language specific display name for said first multi-valued attribute.

28. The method of claim 25, further comprising:
determining said preferred language associated with said request.

29. The method of claim 28, wherein:
determining said preferred language includes determining said preferred language from at least one of a Uniform Resource Locator (URL) associated with said request, a hypertext transfer protocol (HTTP) header variable associated with said request, an identity profile associated with said request, and a cookie associated with said request.

30. The method of claim 25, wherein:
said server is part of an Identity System.

31. The method of claim 25, wherein:
said server is part of an integrated Identity/Access System.

32. One or more processor readable storage devices having processor readable code embodied on said one or more processor readable storage devices, said processor readable code for programming one or more processors, said processor readable code comprising:
code for maintaining, at a data store, an access management system configured to receive a request to view and modify at least one of a plurality of identity profiles, wherein the request is associated with one or more multi-valued attributes, said request is associated with a preferred language;
code for determining, at the access management system, whether the preferred language of the request matches an installed language at the access management system;
in response to the preferred language not matching the installed language, code for performing an approximate language match based at least in part on a language code associated with the preferred language;
code for providing a plurality of multi-valued attributes in a single entry at the data store, wherein said single entry contains all available values for said multi-valued attributes, said plurality of multi-valued attributes comprising a first multi-valued attribute that includes a plurality of values, said plurality of values are indexed using a language component provided as part of each of said plurality of values, each of said plurality of values includes a value for said attribute corresponding to an associated language component;

code for retrieving from the single entry at said data store said plurality of multi-valued attributes; and code for generating a response to a request associated with said first one multi-valued attribute, said request is associated with the preferred language, said response includes at least one first value for said first multi-valued attribute that corresponds to said preferred language.

33. One or more processor readable storage devices according to claim 32, wherein:

said first multi-valued attribute is included in an identity profile maintained at said data store;

said request is a request to view or modify said identity profile; and said response includes said at least one first value for said first multi-valued attribute in a representation of at least a portion of said identity profile.

34. One or more processor readable storage devices according to claim 32, wherein:

said first multi-valued attribute is included in configuration information maintained at said data store; and said at least one first value for said first multi-valued attribute that corresponds to said preferred language is a language specific display name for said first multi-valued attribute.

35. One or more processor readable storage devices according to claim 32, wherein said processor readable code further comprises:

code for determining said preferred language associated with said request.

36. One or more processor readable storage devices according to claim 35, wherein:

said-code for determining said preferred language includes code for determining said preferred language from at least one of a Uniform Resource Locator (URL) associated with said request, a hypertext transfer protocol (HTTP) header variable associated with said request, an identity profile associated with said request, and a cookie associated with said request.

37. One or more processor readable storage devices according to claim 32, wherein:

said server is part of an Identity System.

38. One or more processor readable storage devices according to claim 32, wherein:

said server is part of an integrated Identity/Access System.

39. A system for managing attribute information, comprising:

a data store, said data store comprises an access management system configured to receive a request to view and modify at least one of a plurality of identity profiles, wherein the request is associated with a preferred language, determine whether the preferred language of a requesting user matches an installed language at the access management system, and in response to the preferred language not matching the installed language, perform an approximate language match based at least in part on a language code associated with the preferred language;

the data store further comprises an entry comprising a plurality of multi-valued attributes, wherein the entry comprises a single data structure that includes the plurality of multi-valued attributes, said plurality of multi-valued attributes comprising a first multi-valued attribute having a plurality of language components and value components, each of said value components specifies a value for said first one multi-valued attribute that is associated with a corresponding language component, wherein said entry contains all available language components and value components for said multi-valued attribute; and at least one server in communication with said data store, said at least one server comprising at least one processor and code executable by said at least one processor, said processor readable code comprising:

code for retrieving from the single data structure said first multi-valued attribute to generate a response to a request associated with said first multi-valued attribute, said request is associated with the preferred language, said response includes at least one first value for said first multi-valued attribute that corresponds to said preferred language.

40. The system of claim 39, wherein:

said entry is an identity profile maintained at said data store;

said request is a request to view or modify said identity profile; and said response includes said at least one first value for said first multi-valued attribute in a representation of at least a portion of said identity profile.

41. The system of claim 39, wherein:

said first multi-valued attribute is included in configuration information maintained at said data store; and said at least one first value for said first multi-valued attribute that corresponds to said preferred language is at least one language specific display name for said first multi-valued attribute.

42. The system of claim 39, wherein said processor readable code further comprises:

code for reading said plurality of language components and value components for said first multi-valued attribute; and code for generating a table at said server, said table corresponds to said first multi-valued attribute, includes said plurality of language components and value components, and is indexed according to said plurality of language components.

43. The system of claim 39, wherein said processor readable code further comprises:

code for determining said preferred language associated with said request.

44. The system of claim 43, wherein said processor readable code further comprises:

code for determining said preferred language from at least one of a Uniform Resource Locator (URL) associated with said request, a hypertext transfer protocol (HTTP) header variable associated with said request, an identity profile associated with said request, and a cookie associated with said request.

45. The system of claim 39, wherein:

said server is part of an Identity System.

46. The system of claim 39, wherein:

said server is part of an integrated Identity/Access System.

47. A method of managing attributes in an identity profile, the method comprising:

maintaining, at a data store, an access management system configured to receive a request to view and modify at least one of a plurality of identity profiles, wherein the request is associated with a preferred language;

determining, at the access management system, whether the preferred language of the request matches an installed language at the access management system;

in response to the preferred language not matching the installed language, performing an approximate language match based at least in part on a language code associated with the preferred language;

maintaining, at the data store for the access management system, a plurality of multi-valued attributes in an individual data entry, wherein the individual data entry comprises a single data structure that includes the plurality of multi-valued attributes, wherein each multi-valued attribute includes a plurality of language components and value components, each of said value components specifies a value for said attribute that is associated with a corresponding language component, wherein said entry contains all available language components and value components for said multi-valued attribute;

receiving a request associated with a first multi-valued attribute at a server, said request is associated with the preferred language;

retrieving from the single data structure said first multi-valued attribute; and generating an output in response to said request, said output includes at least one first value for said first attribute that corresponds to said preferred language.

48. The method of claim 47, wherein the data entry is an identity profile.

49. The method of claim 47, wherein the data entry comprises configuration data.

50. The method of claim 47, wherein the access management system comprises an Identity System that provides identity management services for a network.

51. The method of claim 47, wherein the access management system comprises an Access System that provides access management services for a network.

* * * * *

UNITED STATES PATENT AND TRADEMARK OFFICE
CERTIFICATE OF CORRECTION

PATENT NO. : 7,630,974 B2 Page 1 of 1
APPLICATION NO. : 10/952592
DATED : December 8, 2009
INVENTOR(S) : Thomas Remahl et al.

It is certified that error appears in the above-identified patent and that said Letters Patent is hereby corrected as shown below:

On page 5, in column 2, under "Other Publications", line 16, delete "Wirsless" and insert -- Wireless --, therefor.

On page 5, in column 2, under "Other Publications", line 19, delete "Diistributed" and insert -- Distributed --, therefor.

On page 5, in column 2, under "Other Publications", line 20, delete "Coputer" and insert -- Computer --, therefor.

On page 5, in column 2, under "Other Publications", line 52, delete "Internat" and insert -- Internet --, therefor.

On page 8, in column 2, under "Other Publications", line 11, delete "Bried" and insert -- Brief --, therefor.

In column 1, line 34, delete "things.For" and insert -- things. For --, therefor.

In column 5, line 49, delete "Lightwieght" and insert -- Lightweight --, therefor.

In column 21, line 29, in claim 4, delete "configuration-data" and insert -- configuration data --, therefor.

In column 23, line 36, in claim 21, delete "attributes-in" and insert -- attributes in --, therefor.

Signed and Sealed this

Twenty-first Day of September, 2010

David J. Kappos
*Director of the United States Patent and Trademark Office*